United States Patent [19]
Gjerde et al.

[11] Patent Number: 6,024,878
[45] Date of Patent: Feb. 15, 2000

[54] METHOD FOR HIGH RESOLUTION LIQUID CHROMATOGRAPHIC SEPARATION OF POLYNUCLEOTIDES

[75] Inventors: Douglas T. Gjerde, Saratoga; Paul D. Taylor; Robert M. Hae Fele, both of Palo Alto, all of Calif.

[73] Assignee: Transgenomic, Inc., San Jose, Calif.

[21] Appl. No.: 09/183,047

[22] Filed: Oct. 30, 1998

Related U.S. Application Data

[63] Continuation-in-part of application No. 09/058,337, Apr. 10, 1998, which is a continuation-in-part of application No. 09/058,580, Apr. 10, 1998, which is a continuation-in-part of application No. 09/129,105, Aug. 4, 1998
[60] Provisional application No. 60/064,428, Oct. 30, 1997, provisional application No. 60/070,467, Jan. 5, 1998, and provisional application No. 60/103,313, Oct. 6, 1998.

[51] Int. Cl.[7] .................................................. B01D 15/08
[52] U.S. Cl. ............................. 210/635; 210/656; 435/6; 536/25.4; 935/78
[58] Field of Search ................................... 210/635, 656, 210/659, 198.2; 435/6; 536/23.1, 25.4; 935/18, 77, 78

[56] References Cited

U.S. PATENT DOCUMENTS

| | | | |
|---|---|---|---|
| 5,024,934 | 6/1991 | Lee .............................................. | 435/6 |
| 5,100,547 | 3/1992 | Hardiman et al. .................... | 210/198.2 |
| 5,459,039 | 10/1995 | Modrich et al. ............................. | 435/6 |
| 5,585,236 | 12/1996 | Bonn et al. ................................. | 435/5 |
| 5,654,144 | 8/1997 | Mann et al. ................................. | 435/6 |
| 5,698,400 | 12/1997 | Cotton et al. ................................ | 435/6 |
| 5,772,889 | 6/1998 | Gjerde ..................................... | 210/635 |
| 5,795,976 | 8/1998 | Oefner et al. ............................ | 536/25.4 |

FOREIGN PATENT DOCUMENTS

| | | | |
|---|---|---|---|
| WO 99/05308 | 2/1999 | WIPO ................................. | 210/198.2 |
| WO 99/05319 | 2/1999 | WIPO ................................. | 210/198.2 |

OTHER PUBLICATIONS

Apffel et al, Applications of HPLC For The Analysis of Double Stranded DNA Use of Wide Pore Silica Based Materials, ISPP (Oct. 1997) pp. 1–5.

Bernardi, Chromatography of Nucleic Acids on Hydroxyapatite columns Methods of Enzymology, vol. XXI, pp. 94–147, 1971.

Berti, Dissertion, Untersuchungen Zur Ionenpaar–Umkehrphasen–Chromatographie Von DNA, Jun. 1996, pp. 52–53.

Coenen et al. Optimization of The Separation of The PR and SP Diasteromers of Phsphate–Methylated DNA and RNA Dinuleotides, Journal of Chromatography, 596, 59–66, (1992).

Cooper et al. An Estimate of Unique DNA Sequence Heterozygosity in The Human Genome, Hum Genet, vol.69, pp. 201–205 (1985).

Cotton et al, Slowly by Surely Towards Better Scanning for Mutations, Tig, vol. 13 No. 2: 43–46 (Feb. 1997).

Doris et al. Quantitive Analysis of Gene Expression by Ion Pair HPLC, Handout of DHPLC Workshop, Stanford University (Mar. 17, 1997) pp. 1–40.

(List continued on next page.)

*Primary Examiner*—Ernest G. Therkorn
*Attorney, Agent, or Firm*—William B. Walker

[57] ABSTRACT

Mixtures of dsDNA fragments are separated by Matched Ion Polynucleotide Chromatography (MIPC) using an isocratic mobile phase to elute polynucleic acid from an MIPC column. The use of isocratic elution conditions provides a marked improvement in the separation of dsDNA fragments compared to gradient elution conditions. Isocratic elution can also be used to effect an improved separation of heteroduplex and homoduplex mixtures when the chromatography is performed under partially denaturing conditions. In addition, dsDNA fragments are bound to the stationary phase under isocratic conditions until a solvent concentration is reached which releases fragments of a particular base pair length range. This separation process is different from the equilibrium partitioning process observed under gradient elution conditions.

25 Claims, 13 Drawing Sheets

OTHER PUBLICATIONS

Fritz et al. High–Performance Liquid Chromatography in Polynucleotide Synthesis, Biochemistry, 17, 7, pp. 1257–1267, (1978).

Furst et al. Simultaneous Determination of Myocardial Nucleotides, Nucleosides, Purine Bases and Creative Phosphate by Ion–Pair High–Performance Liquid Chromatography, J. Chromatography, 578, 39–44, Jul. 1, 1992.

Green et al. Preparative Purification F Sypercoiled Plasmid DNA for Therapeutic Applications BioPharm, 10:5 pp. 52–62, May 1997.

Green et al. HPLC Purification of Synthetic Oligodeoxribonucleotides Containing Base–and Backbone–Modified Sequences, BioTechniques 19:5, pp. 836–841 (Nov. 1993).

Guyer et al. How is the Human Genome Project Doing, and What Have we Learned So Far?, Proc. Natl. Acad. Sci., vol. 92, pp. 10841–10848, (1995).

Hayward–Lester et al, Accurate and Absolute Quantitative Measurement of Gene Expression by Single–Tube RT–PCR and HPLC, Genome Research, No. 5: 494–499 (1995).

Heftman, Chromatography, 5th Edition, Journal of Chromatography Library —vol. 51A, Elsevier, pp. A299–A300, 1992.

Hirabayashi et al. Size–Dependent Chromatographic Separation of Double–Stranded DNA Which is Not Based on Gel Permeation Mode, Analytical biochemistry, 178, 336–341, 1989.

Huber et al, High–Resolution Liquid Chromatography of Oligonucleotides on Nonporous Alkylated Styrene–Divinylbenzene Copolymers, Analytical Biochemistry, 212: 351–358 (1993).

Huber et al, Rapid Analysis of Biopolymers on Modified Non–Porous Polystryene–Divinylbenzene Particles, Chromatographia, vol. 37 No. 11/12: 653–658 (Dec. 1993).

Ip et al. Separation O Nucleosides and Nucleotides By Reversed–Phase HPLC with Volatile Buffers Allowing Sample Recovery, Analytical Biochemistry, 147, 180–185, (1985).

Kwiatkowski et al. Use of RP Ion Pair Chromatography to Fraction and Purify DNA Fragments and Monomeric Components of RNA, Acta Chemica scandinavica B. 38, p, 721–733, (1984).

Liu et al, Denaturing High Performance Liquid Chromatography (DHPLC) Used in the Detection of Germline and Somatic Mutaions, Nucleic Acid Research, vol. 26 No. 6: 1396–1400 (1998).

Moriyama et al. New RP HPLC Column for Oligonucleotide Separation, Journal of Chromatography, 445, 225–223, (1988).

Taylor, Graham R., Laboratory Methods for the Detection of Mutations and Polymorphisms in DNA, 18–22, CRC Press, Boca Raton, New York (1997).

Underhill et al, A Pre–Columbian Y Chromosome–Specific Transition and its Implications for Human Evolutionary History, Proc. Natl. Acad. Sci., 93: 196–200 (Jan. 1996).

Underhill et al, Detection of Numerous Y Chromosome Biallelic Polymorphisms By Denaturing High–Performance Liquid Chromatography, Genome Research, No. 7: 996–1005 (1997).

Vtorushna et al. Study of Diasteromers of Non–Ionic Oligonucleotide Analogues. VI. Separation of Disasteromers of Ethyl Phosphotriesters O Octanucleotide d(GCCAAACA) by Means of HP Complementary Chromatography, Bioorg. Khim. 18, 1, 92–99 (1992).

Zon et al. High Performance Liquid Chromatography in Biotechnology, Hancock (ed.) John Wiley & Sons, New York, NY, 1990, pp. 301–398.

Tashlitskii et al. Optimization of Conditions for Ion–Pair HPLC of Oligonucleotides Bioorg. Khim., 23 (9), 732–741 (1997) Biosis Abstract No. 01070821.

Hewlett–Packard, Zorbax Stable Bond Zorbax Eclipse Reverse Phase HPLC Columns, Product Specification undated pp. 1–7.

Transgenomic, Inc. Technical Note General Description: DNASep undated pp. 1–8.

Djordjevic et al, HPLC Separation of Oligonucleotides in Isocratic and Temperature–Programming Mode, Analytical Chemistry, 70: 1921–1925 (1998).

Li et al., Strategies for Faster Gradient Chromatography, LC–GC, vol. 16 No. 5 (May 1998) pp. 468–476.

Snyder et al. Gradient Elution in Reversed–Phase HPLC, Anal. Chem. (1983) 55: 1412A–1430A, No. 14.

| CONC B (%) | 80bp RT (MIN) | 102bp RT (MIN) | 174bp RT (MIN) | 257bp RT (MIN) | 267bp RT (MIN) | 298bp RT (MIN) | 434bp RT (MIN) | 458bp RT (MIN) | 587bp RT (MIN) |
|---|---|---|---|---|---|---|---|---|---|
| 46 | 3.64 | 9.31 | — | — | — | — | — | — | — |
| 47 | 3.00 | 6.31 | — | — | — | — | — | — | — |
| 48 | 2.64 | 4.75 | — | — | — | — | — | — | — |
| 49 | 2.38 | 3.59 | — | — | — | — | — | — | — |
| 50 | 2.26 | 3.00 | — | — | — | — | — | — | — |
| 51 | 2.19 | 2.56 | 20.64 | — | — | — | — | — | — |
| 52 | 2.13 | 2.33 | 11.78 | — | — | — | — | — | — |
| 53 | 2.10 | 2.19 | 7.22 | — | — | — | — | — | — |
| 54 | 2.14 | 2.14 | 4.89 | — | — | — | — | — | — |
| 55 | 2.08 | 2.08 | 3.55 | 20.01 | — | — | — | — | — |
| 56 | 2.06 | 2.06 | 2.82 | 10.75 | 13.81 | — | — | — | — |
| 57 | 2.04 | 2.04 | 2.41 | 6.35 | 7.72 | 13.78 | — | — | — |
| 58 | 2.01 | 2.01 | 2.21 | 4.36 | 5.09 | 8.08 | — | — | — |
| 59 | 2.01 | 2.01 | 2.10 | 3.19 | 3.56 | 4.99 | — | — | — |
| 60 | 2.04 | 2.04 | 2.04 | 2.55 | 3.39 | 3.41 | 16.19 | — | — |
| 61 | 2.00 | 2.00 | 2.00 | 2.25 | 2.31 | 2.64 | 8.04 | 10.71 | — |
| 62 | 2.00 | 2.00 | 2.00 | 2.11 | 2.11 | 2.28 | 4.56 | 5.62 | 18.25 |

FIG.-23

METHOD FOR HIGH RESOLUTION LIQUID CHROMATOGRAPHIC SEPARATION OF POLYNUCLEOTIDES

CROSS REFERENCE TO RELATED CO-PENDING APPLICATIONS

This application is a regular U.S. patent application under 35 U.S.C. §111(a) and 37 C.F.R. 1.53(b) and claims priority from the following co-pending, commonly assigned provisional applications, each filed under 35 U.S.C. §111(b):

Ser. No. 60/064,428 filed Oct. 30, 1997

Ser. No. 60/070,467 filed Jan. 5, 1998

Ser. No. 60/103,313, filed Oct. 6, 1998 and is a continuation-in-part of each of:

Ser. No. 09/058,337 filed Apr. 10, 1998,

Ser. No. 09/058,580 filed Apr. 10, 1998, and

Ser. No. 09/129,105 filed Aug. 4, 1998.

The entire contents of the above-listed pending application are hereby incorporated by reference.

FIELD OF THE INVENTION

The present invention concerns the liquid chromatographic separation of polynucleotides on columns containing non-polar separation media. More particularly, this invention concerns the enhancement of such separations when an isocratic mobile phase is used in the chromatography.

BACKGROUND OF THE INVENTION

Mixtures of double stranded nucleic acid fragments having different base pair lengths are separated for numerous and diverse reasons. The ability to detect mutations in double stranded polynucleotides, and especially in DNA fragments which have been amplified by PCR, presents a somewhat different problem since DNA fragments containing mutations are generally the same length as their corresponding wild type (defined herein below) but differ in base sequence.

DNA separation and mutation detection are of great importance in medicine, as well as in the physical and social sciences, as well as in forensic investigations. The Human Genome Project is providing an enormous amount of genetic information which is setting new criteria for evaluating the links between mutations and human disorders (Guyer, et al., *Proc. Natl. Acad. Sci. USA* 92:10841 (1995)). The ultimate source of disease, for example, is described by genetic code that differs from wild type (Cotton, *TIG* 13:43 (1997)). Understanding the genetic basis of disease can be the starting point for a cure. Similarly, determination of differences in genetic code can provide powerful and perhaps definitive insights into the study of evolution and populations (Cooper, et. al., *Human Genetics* 69:201 (1985)). Understanding these and other issues related to genetic coding is based on the ability to identify anomalies, i.e., mutations, in a DNA fragment relative to the wild type. A need exists, therefore, for a methodology which can separate DNA fragments based on size differences as well as separate DNA having the same length but differing in base pair sequence (mutations from wild type), in an accurate, reproducible, reliable manner. Ideally, such a method would be efficient and could be adapted to routine high throughput sample screening applications.

DNA molecules are polymers comprising sub-units called deoxynucleotides. The four deoxynucleotides found in DNA comprise a common cyclic sugar, deoxyribose, which is covalently bonded to any of the four bases, adenine (a purine), guanine (a purine), cytosine (a pyrimidine), and thymine (a pyrimidine), hereinbelow referred to as A, G, C, and T respectively. A phosphate group links a 3'-hydroxyl of one deoxynucleotide with the 5'-hydroxyl of another deoxynucleotide to form a polymeric chain. In double stranded DNA, two strands are held together in a helical structure by hydrogen bonds between, what are called, complimentary bases. The complimentarity of bases is determined by their chemical structures. In double stranded DNA, each A pairs with a T and each G pairs with a C, i.e., a purine pairs with a pyrimidine. Ideally, DNA is replicated in exact copies by DNA polymerases during cell division in the human body or in other living organisms. DNA strands can also be replicated in vitro by means of the Polymerase Chain Reaction (PCR).

Sometimes, exact replication fails and an incorrect base pairing occurs, which after further replication of the new strand, results in double stranded DNA offspring containing a heritable difference in the base sequence from that of the parent. Such heritable changes in base pair sequence are called mutations.

In the present invention, double stranded DNA is referred to as a duplex. When a base sequence of one strand is entirely complimentary to a base sequence of the other strand, the duplex is called a homoduplex. When a duplex contains at least one base pair which is not complimentary, the duplex is called a heteroduplex. A heteroduplex is formed during DNA replication when an error is made by a DNA polymerase enzyme and a non-complimentary base is added to a polynucleotide chain being replicated. Further replications of a heteroduplex will, ideally, produce homoduplexes which are heterozygous, i.e., these homoduplexes will have an altered sequence compared to the original parent DNA strand. When the parent DNA has a sequence which predominates in a naturally occurring population, it is generally called "wild type".

Many different types of DNA mutations are known. Examples of DNA mutations include, but are not limited to, "point mutation" or "single base pair mutations" wherein an incorrect base pairing occurs. The most common point mutations comprise "transitions" wherein one purine or pyrimidine base is replaced for another and "transversions" wherein a purine is substituted for a pyrimidine (and visa versa). Point mutations also comprise mutations wherein a base is added or deleted from a DNA chain. Such "insertions" or "deletions" are also known as "frameshift mutations". Although they occur with less frequency than point mutations, larger mutations affecting multiple base pairs can also occur and may be important. A more detailed discussion of mutations can be found in U.S. Pat. No. 5,459,039 to Modrich (1995), and U.S. Pat. No. 5,698,400 to Cotton (1997). These references and the references contained therein are incorporated in their entireties herein.

The sequence of base pairs in DNA code for the production of proteins. In particular, a DNA sequence in the exon portion of a DNA chain codes for the a corresponding amino acid sequence in a protein. Therefore, a mutation in a DNA sequence may result in an alteration in the amino acid sequence of a protein. Such an alteration in the amino acid sequence may be completely benign or may inactivate a protein or alter its function to be life threatening or fatal. On the other hand, mutations in an intron portion of a DNA chain would not be expected to have a biological effect since an intron section does not contain code for protein production. Nevertheless, mutation detection in an intron section may be important, for example, in a forensic investigation.

Detection of mutations is, therefore, of great interest and importance in diagnosing diseases, understanding the origins of disease and the development of potential treatments. Detection of mutations and identification of similarities or differences in DNA samples is also of critical importance in increasing the world food supply by developing diseases resistant and/or higher yielding crop strains, in forensic science, in the study of evolution and populations, and in scientific research in general (Guyer, et al., *Proc. Natl. Acad. Sci. USA* 92:10841 (1995); Cotton, *TIG* 13:43 (1997)).

Alterations in a DNA sequence which are benign or have no negative consequences are sometimes called "polymorphisms". In the present invention, any alterations in the DNA sequence, whether they have negative consequences or not, are denoted as "mutations". It is to be understood that the method and system of this invention have the capability to detect mutations regardless of biological effect or lack thereof. For the sake of simplicity, the term "mutation" will be used throughout to mean an alteration in the base sequence of a DNA strand compared to a reference strand (generally, but not necessarily, wild type). It is to be understood that in the context of this invention, the term "mutation" includes the term "polymorphism" or any other similar or equivalent term of art.

A need exists for an accurate and reproducible analytical method for mutation detection which is easy to implement. Ideally, the method would be automated and provide high throughput sample screening with a minimum of operator attention, is also highly desirable.

Prior to this invention, size based analysis of DNA samples relied upon separation by gel electrophoresis (GEP). Capillary gel electrophoresis (CGE) has also been used to separate and analyze mixtures of DNA fragments having different lengths, e.g., the different lengths resulting from restriction enzyme cleavage. However, these methods cannot distinguish DNA fragments which differ in base sequence, but have the same base pair length. Therefore, gel electrophoresis cannot be used directly for mutation detection. This is a serious limitation of GEP.

Gel based analytical methods, such as denaturing gradient gel electrophoresis (DGGE) and denaturing gradient gel capillary electrophoresis (DGGC), can detect mutations in heteroduplex DNA strands under "partially denaturing" conditions. The term "partially denaturing" means the separation of a mismatched base pair (caused by temperature, pH, solvent, or other factors) in a DNA double strand while the remainder of the double strand remains intact. The phenomenon of "partial denaturation" is well known in the art and occurs because a heteroduplex will denature at the site of base pair mismatch at a lower temperature than is required to denature the remainder of the strand. However, these gel based techniques are operationally difficult to implement and require highly skilled personnel. In addition, the analyses are lengthy and require a great deal of set up time. A denaturing capillary gel electrophoresis analysis is limited to relatively small fragments. Separation of a 90 base pair fragment takes more than 30 minutes. A gradient denaturing gel runs overnight and requires about a day of set up time. Additional deficiencies of gradient gels are the isolation of separated DNA fragments (which requires specialized techniques and equipment) and analysis conditions must be experimentally developed for each fragment (Laboratory Methods for the Detection of Mutations and Polymorphisms, ed. G. R. Taylor, CRC Press, 1997). The long analysis time of the gel methodology is further exacerbated by the fact that the movement of DNA fragments in a gel is inversely proportional, in a geometric relationship, to their length. Therefore, the analysis time of longer DNA fragments can be often be untenable.

In addition to the deficiencies of denaturing gel methods mentioned above, these techniques are not always reproducible or accurate since the preparation of a gel and running an analysis can be highly variable from one operator to another, and in general, suffer from serious deficiencies which are inherent to the art.

Recently, an HPLC based ion pairing chromatographic method was introduced to effectively separate mixtures of double stranded polynucleotides, in general and DNA, in particular, wherein the separations are based on base pair length. This method is described in the following references which are incorporated herein in their entireties: U.S. Pat. No. 5,795,976 (1998) to Oefner; U.S. Pat. No. 5,585,236 (1996) to Bonn; Huber, et al., *Chromatographia* 37:653 (1993); Huber, et al., *Anal. Biochem.* 212:351 (1993).

As the use and understanding of HPLC developed it became apparent that when HPLC analyses were carried out at a partially denaturing temperature, i.e., a temperature sufficient to denature a heteroduplex at the site of base pair mismatch, homoduplexes could be separated from heteroduplexes having the same base pair length (Hayward-Lester, et al., *Genome Research* 5:494 (1995); Underhill, et al., *Proc. Natl. Acad. Sci. USA* 93:193 (1996); Doris, et al., *DHPLC Workshop*, Stanford University, (1997)). These references and the references contained therein are incorporated herein in their entireties. Thus, the use of Denaturing HPLC (DHPLC) was applied to mutation detection (Underhill, et al., *Genome Research* 7:996 (1997); Liu, et al., *Nucleic Acid Res.*, 26;1396 (1998)).

DHPLC can separate heteroduplexes that differ by as little as one base pair. However, in certain cases, separations of homoduplexes and heteroduplexes are poorly resolved. Artifacts and impurities can interfere with the interpretation of DHPLC separation chromatograms in the sense that it may be difficult to distinguish between an artifact or impurity and a putative mutation (Underhill, et al., *Genome Res.* 7:996 (1997)). The presence of mutations may even be missed entirely (Liu, et al., *Nucleic Acid Res.* 26:1396 (1998)). The references cited above and the references contained therein are incorporated in their entireties herein.

The accuracy, reproducibility, convenience and speed of DNA fragment separations and mutation detection assays based on HPLC have been compromised in the past because of HPLC system related problems. Applicants have addressed these problems and applied the term "Matched Ion Polynucleotide Chromatography" (MIPC) to the separation method and system which is used in connection with the present invention. When used under partially denaturing conditions, MIPC is defined herein as Denaturing Matched Ion Polynucleotide Chromatography (DMIPC).

The term "Matched Ion Polynucleotide Chromatography" as used herein is defined as a process for separating single and double stranded polynucleotides using non-polar separation media, wherein the process uses a counterion agent, and an organic solvent to release the polynucleotides from the separation media. MIPC separations are routinely complete in less than 10 minutes, and frequently in less than 5 minutes. MIPC systems (WAVE™ DNA Fragment Analysis System, Transgenomic, Inc. San Jose, Calif.) are equipped with computer controlled ovens which enclose the columns and column inlet areas. Non-limiting examples of key distinguishing features of MIPC include the a) use of hardware having liquid contacting surfaces which do not release multivalent cations therefrom, b) protection of liquid contacting surfaces from exogenous multivalent cations by means cartridges containing multivalent cation capture resins, c) the use of a special washing protocol for MIPC separation media, d) automated selection of an optimum solvent gradient solvent gradient for elution of a specific base length DNA fragment, and e) automated determination of the temperature required to effect partial denaturation of a heteroduplex when MIPC is used under partially denaturing conditions (DMIPC) for mutation detection.

The present invention can be used in the separation of RNA or of double- or single-stranded DNA. For purposes of simplifying the description of the invention, and not by way of limitation, the separation of double-stranded DNA will be described in the examples herein, it being understood that all polynucleotides are intended to be included within the scope of this invention. The invention applies to size-dependent separations and denaturing separations by MIPC. Both these separations can include separations of DNA fragments having non-polar tags.

Important aspects of DNA separation and mutation detection by HPLC and DHPLC which have not been heretofore addressed, comprise a) the treatment of, and materials comprising chromatography system components, b) the treatment of, and materials comprising separation media, c) solvent pre-selection to minimize methods development time, d) optimum temperature pre-selection to effect partial denaturation of a heteroduplex during HPLC and e) optimization of DHPLC for automated high throughput mutation detection screening assays. These factors, which comprise MIPC/DMIPC but not HPLC/DHPLC, are essential when using chromatographic methods in order to achieve unambiguous, accurate, reproducible and high throughput DNA separations and mutation detection results. A comprehensive description of MIPC systems and separation media, including the critical importance of maintaining an environment which is free of multivalent cations, is presented in U.S. Pat. No. 5,772,889 (1998) to Gjerde and U.S. patent application Ser. Nos. 09/129,105 filed Aug. 4, 1998; 09/081,040 filed May 18, 1998; 09/080,547 filed May 18, 1998; 09/058,580 filed Apr. 10, 1998; 09/058,337 filed Apr. 10, 1998; 09/065,913 filed Apr. 24, 1998; 09/039,061 filed Mar. 13, 1998; 09/081,039 filed May 18, 1998. These references and the references contained therein are incorporated in their entireties herein.

All the liquid chromatographic separations discussed herein above comprise gradient elution, i.e., they utilize a multi-component mobile phase wherein the concentration of the driving component, usually an organic solvent, is increased during the course of the chromatography. This approach reduces the time required to complete an analysis. However, the separation of mixture components can be compromised. Efforts have been made to improve the resolving power of MIPC. These efforts have centered on improving the gradient process, changing the column particle size, or changing the column length. However, only small improvements have been achieved with these efforts. Therefore, there exists a need improve the separation of poorly resolved or close running components. Such improvement is especially useful when it is important to isolate a component in pure form, as for example, for PCR amplification, sequencing, mutation detection, and numerous other applications.

SUMMARY OF THE INVENTION

Accordingly, one object of the present invention is to provide a method to improve the resolution of dsDNA fragments in a mixture. Another object of the present invention is to provide a method for detecting mutations which utilizes a chromatographic method for separating homoduplex and heteroduplex molecules with improved separation and efficiency.

These and other objects which will become apparent from the following specification have been achieved by the present invention.

In one aspect, the invention is a method for separating a mixture of polynucleotides which includes (a) flowing a mixture of polynucleotides having a target range of base pairs through a separation column containing a separation medium having a nonpolar separation surface, and (b) separating the mixture by eluting the column using a mobile phase having a composition which remains essentially constant for the duration of the chromatographic separation (i.e., an essentially isocratic elution). The mixture can be the product of a PCR amplification. The elution conditions can be adjusted to select various target ranges. For example, the target range can be 1–5,000 bp (base pairs), 1–2,000 bp, 1–99 bp, 100–199 bp, 200–299 bp, 300–399 bp, or 400–499 bp. The preferred non-polar separation surface is nonporous. A less preferred separation surface is porous. The preferred polymeric beads have an average diameter of 0.5 to 100 microns. The beads can be made from polymers, including mono- and di-vinyl substituted aromatic compounds such as styrene, substituted styrenes, alpha-substituted styrenes and divinylbenzene; acrylates and methacrylates; polyolefins such as polypropylene and polyethylene; polyesters; polyurethanes; polyamides; polycarbonates; and substituted polymers including fluorosubstituted ethylenes commonly known under the trademark TEFLON. The base polymer can also be mixtures of polymers, non-limiting examples of which include poly(styrene-divinylbenzene) and poly (ethylvinylbenzene-divinylbenzene). The polymer can be unsubstituted, or substituted with a hydrocarbon such as an alkyl group having from 1 to 1,000,000 carbons. In a preferred embodiment, the hydrocarbon is an alkyl group having from 1 to 24 carbons. In more preferred embodiment, the alkyl group has 1–8 carbons. The beads preferably have an average diameter of about 1–5 microns.

In another preferred embodiment, the separation medium includes beads which are comprised of particles coated with a hydrocarbon or non-polar hydrocarbon substituted polymer, or particles having substantially all polar groups which are derivatized with a non-polar hydrocarbon or substituted hydrocarbon group. The beads preferably have an average diameter of about 1–5 microns. The nonporous particle is preferably selected from silica, silica carbide, silica nitrite, titanium oxide, aluminum oxide, zirconium oxide, carbon, insoluble polysaccharides such as cellulose, and diatomaceous earth, or any of these materials that have been modified to be nonporous. The nonporous particle is most preferably silica, which preferably is substantially free from underivatized silanol groups. The particles can be prepared by non-covalently bonded coatings, covalently bonded coatings, or reaction of the silanol groups with hydrocarbon groups. The nonporous particle can be coated with a polymer. The polymer is preferably selected from polystyrenes, polymethacrylates, polyethylenes, polyurethanes, polypropylenes, polyamides, cellulose, polydimethyl siloxane, and polydialkyl siloxane. The polymer is optionally unsubstituted or substituted with hydrocarbon groups or other groups having nonionic substituents. The polymer can be optionally substituted with hydrocarbon groups having from 1 to 1,000,000 carbons, the hydrocarbon groups optionally being alkyl groups with from 1 to 100 carbons and preferably from 1 to 24 carbons. Hydrocarbon groups from 24 to 1,000,000 are described herein as hydrocarbon polymers and have the constituency of hydrocarbon groups as defined herein. The reaction of organosilanols (e.g. HO—Si—$R_3$) or alkoxy- (e.g., RO—Si—$R_3$) silanes with silica supports without polymerization can also produce good packings. The method produces a dense monolayer of functional groups of alkyl or alkylsubstituted, ester, cyano, and other nonionic groups. The use of monofunctional dimethyl silanes (X—Si$(CH_3)_2$—R) provides a homogeneous organic coating with a minimum of residual Si—OH groups. Monochlorosilane reagents are preferred, if the required organic functionality can be prepared. These reactions are reproducible and provide high quality packing materials. Unreacted, accessible silanols can be left after the initial reaction. The nonporous particle is preferably endcapped with a tri(lower alkyl)chlorosilane (preferably a trimethylchlorosilane) to block residual reactive silanol sites following the coating or hydrocarbon substitution. Alternatively, all of the silanol sites can be reacted with an excess of the endcapping reagent to extinguish all reactive silanol groups. Endcapping of the nonporous particle can be effected by reaction of the nonporous particle with the corresponding hydrocarbon substituted halosilane, such as trialkyl chlorosilane (eg. trimethyl chlorosilane) or by reaction with the corresponding hydrocarbon substituted disilazane, such as dichloro-tetraalkyl-disilazane (eg. dichloro-tetramethyl-disilazane).

Other separation media, such as polymeric monoliths or silica gel monoliths having non-polar separation surfaces, are also suitable for use in the method of the invention.

In a preferred embodiment of the invention, precautions are taken during the production of the separation medium so that it is substantially free of multivalent cation contaminants and the medium is treated, for example by an acid wash treatment and/or treatment with multivalent cation binding agent, to remove any residual surface metal contaminants.

The elution step preferably uses a mobile phase containing a counterion agent and a water-soluble organic solvent. Examples of a suitable organic solvent include alcohol, nitrile, dimethylformamide, tetrahydrofuran, ester, ether, and mixtures of one or more thereof, e.g., methanol, ethanol, 2-propanol, 1-propanol, tetrahydrofuran, ethyl acetate, acetonitrile. The most preferred organic solvent is acetonitrile. The counterion agent is preferably selected from the group consisting of lower primary amine, lower secondary amine, lower tertiary amine, lower trialkyammonium salt, quaternary ammonium salt, and mixtures of one or more thereof. Non-limiting examples of counterion agents include octylammonium acetate, octyidimethylammonium acetate, decylammonium acetate, octadecylammonium acetate, pyridiniumammonium acetate, cyclohexylammonium acetate, diethylammonium acetate, propylethylammonium acetate, propyidiethylammonium acetate, butylethylammonium acetate, methylhexylammonium acetate, tetramethylammonium acetate, tetraethylammonium acetate, tetrapropylammonium acetate, tetrabutylammonium acetate, dimethydiethylammonium acetate, triethylammonium acetate, tripropylammonium acetate, tributylammonium acetate, and mixtures of any one or more of the above. The counterion agent includes an anion, e.g., acetate, carbonate, bicarbonate, phosphate, sulfate, nitrate, propionate, formate, chloride, perchlorate, or bromide. The most preferred counterion agent is triethylammonium acetate or triethylammonium hexafluoroisopropyl alcohol. The mobile phase can also contain a multivalent cation binding agent for binding multivalent cation contaminants. In a preferred embodiment, the multivalent cation binding agent is a coordination compound, examples of which include water-soluble chelating agents and crown ethers. Specific examples include acetylacetone, alizarin, aluminon, chloranilic acid, kojic acid, morin, rhodizonic acid, thionalide, thiourea, α-furildioxime, nioxime, salicylaldoxime, dimethylglyoxime, α-furildioxime, cupferron, α-nitroso-β-naphthol, nitroso-R-salt, diphenylthiocarbazone, diphenylcarbazone, eriochrome black T, PAN, SPADNS, glyoxal-bis(2-hydroxyanil), murexide, α-benzoinoxime, mandelic acid, anthranilic acid, ethylenediamine, glycine, triaminotriethylamine, thionalide, triethylenetetramine, ethylenediaminetetraacetic acid (EDTA), metalphthalein, arsonic acids, α,α'-bipyridine, 4-hydroxybenzothiazole, 8-hydroxyquinaldine, 8-hydroxyquinoline, 1,10-phenahthroline, picolinic acid, quinaldic acid, α,α',α"-terpyridyl, 9-methyl-2,3,7-trihydroxy-6-fluorone, pyrocatechol, salicylic acid, tiron, 4-chloro-1,2-dimercaptobenzene, dithiol, mercaptobenzothiazole, rubeanic acid, oxalic acid, sodium diethyldithiocarbarbamate, and zinc dibenzyldithiocarbamate. However, the most preferred chelating agent is EDTA.

In another aspect of the invention, the mixture of polynucleotides to be separated includes at least a portion of a preliminary mixture of polynucleotides, the preliminary mixture of polynucleotides having been separated during a preliminary elution by flowing the preliminary mixture through a column containing a separation medium having a non-polar separation surface and separating the preliminary mixture using a preliminary mobile phase having a composition which varies during the preliminary elution. For example, the preliminary mobile phase can include a concentration gradient of at least one component of the preliminary mobile phase. The preliminary mobile phase preferably includes an organic solvent and a counterion agent. In a preferred embodiment, the concentration of the organic solvent increases in a gradient (e.g., a linear gradient) during the preliminary elution. The preliminary mobile phase can also contain a multivalent cation binding agent for binding multivalent cation contaminants. In a preferred embodiment, the multivalent cation binding agent is a coordination compound, examples of which include water-soluble chelating agents and crown ethers. Specific examples include acetylacetone, alizarin, aluminon, chloranilic acid, kojic acid, morin, rhodizonic acid, thionalide, thiourea, α-furildioxime, nioxime, salicylaldoxime, dimethylglyoxime, α-furildioxime, cupferron, α-nitroso-β-naphthol, nitroso-R-salt, diphenylthiocarbazone, diphenylcarbazone, eriochrome black T, PAN, SPADNS, glyoxal-bis(2-hydroxyanil), murexide, α-benzoinoxime, mandelic acid, anthranilic acid, ethylenediamine, glycine, triaminotriethylamine, thionalide, triethylenetetramine, ethylenediaminetetraacetic acid (EDTA), metalphthalein, arsonic acids, α,α'-bipyridine, 4-hydroxybenzothiazole, 8-hydroxyquinaldine, 8-hydroxyquinoline, 1,10-phenanthroline, picolinic acid, quinaldic acid, α,α',α"-terpyridyl, 9-methyl-2,3,7-trihydroxy-6-fluorone, pyrocatechol, salicylic acid, tiron, 4-chloro-1,2-dimercaptobenzene, dithiol, mercaptobenzothiazole, rubeanic acid, oxalic acid, sodium diethyldithiocarbarbamate, and zinc dibenzyldithiocarbamate. However, the most preferred chelating agent is EDTA.

In yet another aspect, the instant invention concerns a chromatographic method for separating a mixture of heteroduplex and homoduplex DNA molecules under conditions which selectively denature a mutation site present in the heteroduplex DNA molecule, including the steps of (a) applying the mixture to a separation column containing a separation medium having a non-polar separation surface, and (b) separating the mixture by eluting the column using a mobile phase having a composition which remains essentially constant for the duration of the chromatographic separation. The elution step preferably uses a mobile phase containing a counterion agent and a water-soluble organic solvent, and optionally includes a multivalent cation binding agent for binding multivalent cation contaminants.

BRIEF DESCRIPTION OF THE DRAWINGS

FIG. 23 is a list of the retention times in minutes of pUC18 DNA-HaeIII restriction enzyme digest fragments of lengths 80–587 base pairs.

DETAILED DESCRIPTION OF THE INVENTION

In its most general form, the present invention provides a liquid chromatography method for separating polynucleotides, especially double stranded DNA (dsDNA). More specifically, the invention provides a method for improved resolution of polynucleotide separations, wherein an isocratic mobile phase is used to elute polynucleic acid from the chromatography column.

Although the method of the invention relates to polynucleotides in general, the discussion to follow will reference double stranded DNA (dsDNA) for the sake of simplicity only and not by way of limitation.

A "gradient", as defined herein, is a chromatographic mobile phase defined by an initial time point having an initial solvent composition and a final time point having a final solvent composition, wherein the gradient composition continually changes (e.g. increases) from the initial solvent composition to the final solvent composition over the time interval between the initial and final time points. A gradient mobile phase is used to elute fragments from a chromatography column for the purpose of separating the components in a mixture.

The term "isocratic" is defined herein to denote a chromatographic mobile phase whose composition remains essentially constant for any part of or all of the duration of the chromatographic separation process. The term "isocratic" is intended to include a process wherein a single solvent concentration is maintained throughout the separation, a process where the solvent concentration is stepped from one constant concentration to one or more constant concentrations in a sequence of steps, or a process with a gradient separation and with one or more portions conducted under constant solvent concentration conditions. An isocratic mobile phase is used to elute fragments from a chromatography column for the purpose of separating a mixture thereon, into its components (Remington: *The Science and Practice of Pharmacy*, $19^{th}$ Ed., A. Gennaro, Ed. p. 537 (1995)). This reference is incorporated in its entirety herein. The isocratic separation solvent concentration should be maintained within ±1% of the selected isocratic solvent concentration and is preferably maintained within ±0.5% of the selected isocratic solvent concentration. Optimally, the isocratic solvent concentration is maintained with ±0.1% of the selected isocratic solvent concentration.

There is generally a wide range of interactions with the column. Typically, fragments of many various sizes are analyzed. For example, separation of fragments of 80 to 600 base pairs on MIPC columns require acetonitrile concentrations of about 8.75% to 16.25%, respectively. Longer fragments require further increases in acetonitrile concentrations. Therefore, to perform separation of an entire range of fragment sizes, a gradient process is necessary. Otherwise, it is not possible to separate this range of sizes.

Figure 3:
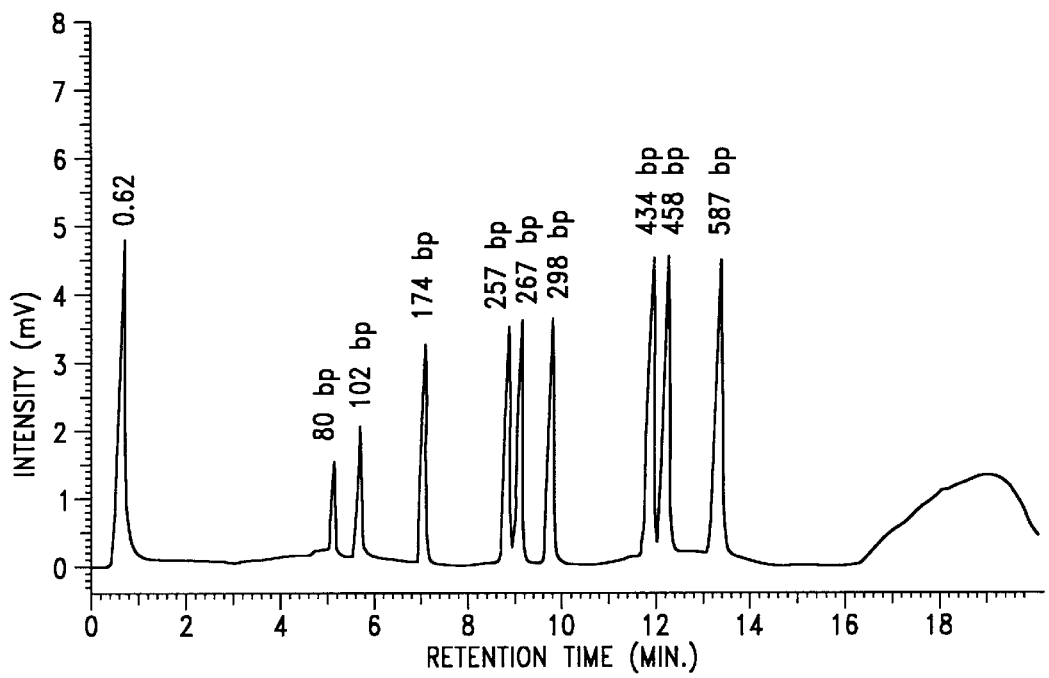
FIG. 3 is a MIPC chromatogram showing the separation of a pUC18 DNA-HaeIII restriction enzyme digest using a gradient mobile phase.
Figure 7:
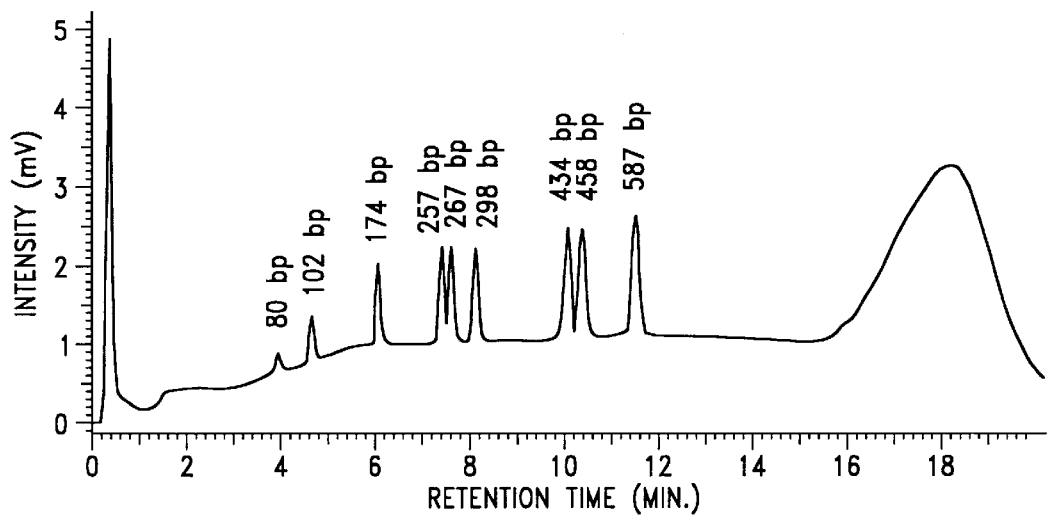
FIG. 7 is a MIPC chromatogram showing the separation of a pUC18 DNA-HaeIII restriction enzyme digest using a gradient mobile phase.

In the course of investigating the MIPC methodology, Applicants surprisingly found that, contrary to all other chromatographic methods, separation of dsDNA fragments did not depend on the length of a MIPC column when the fragments were eluted with a mobile phase gradient in which the organic solvent component of the mobile phase was increased with time. For example, gradient elution size separations performed on a 1.0 cm column afforded the same resolution of mixture components as separations performed on a 5 cm column (FIGS. 3 and 7). This result clearly indicated that the mechanism of the MIPC separation process was different from the generally accepted chromatography mechanism involving equilibrium partitioning of an analyte between mobile phase and stationary phase. The finding that liquid chromatographic separations of dsDNA are not largely dependent on column length under gradient elution conditions has not heretofore been reported.

Efforts to change the column length in other types of gradient separation, (i.e., proteins) have not shown the same type of separation. This is presumably because different types of proteins have different interactions with the chromatographic column, so while changing the column length will give a similar chromatogram for the protein separation, changes in selectivity are observed. Thus, it is apparent that partitioning is present in protein and other organic chromatographic separations.

Figure 10:
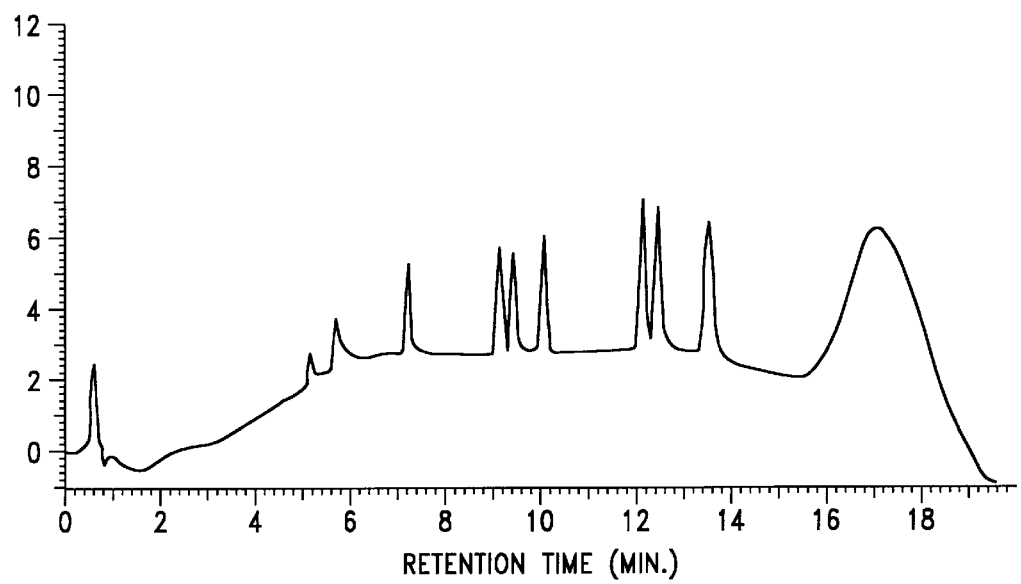
FIG. 10 is a MIPC chromatogram showing the separation of a pUC18 DNA-HaeIII restriction enzyme digest using a gradient mobile phase.
Figure 11:
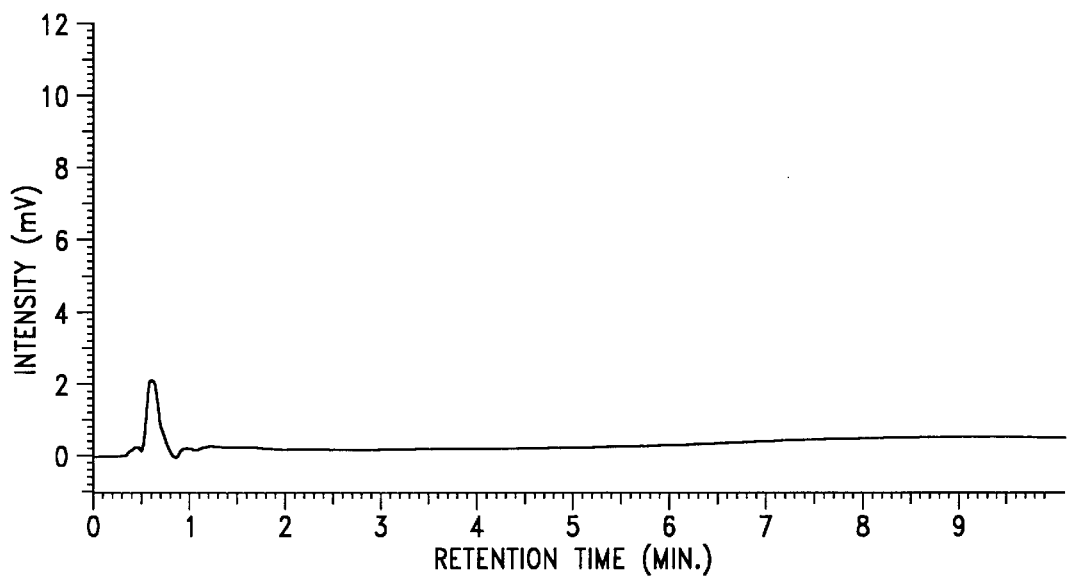
FIG. 11 is identical to FIG. 10 except that the fragments were eluted with an isocratic mobile phase comprising about 8.75% acetonitrile.
Figure 12:
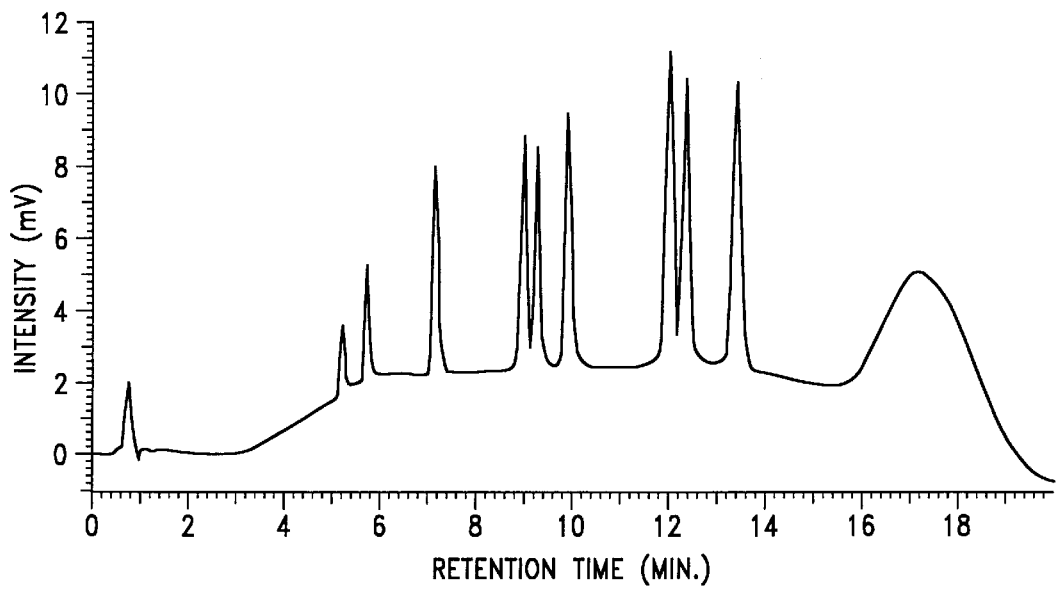
FIG. 12 is a chromatogram showing the separation of a pUC18 DNA-HaeIII restriction enzyme digest applied to the column used in FIG. 11 and eluted with a gradient mobile phase.

In order to confirm the unexpected observation described above, Applicants performed separations of dsDNA on a MIPC column, wherein the column was eluted with gradient mobile phase. In a first separation, an aliquot of pUC18 DNA-HaeIII restriction enzyme digest (D-6293, Sigma-Aldrich Corp. St. Louis, Mo.) was applied to a MIPC column. The column was eluted with a gradient as described in Example 1. A normal separation was obtained as shown in FIG. 10. An injection of a second aliquot was made and the column was eluted with an isocratic mobile phase comprising 35% acetonitrile. FIG. 11 shows that none of the mixture components eluted over a ten minute time period. A third aliquot was injected onto the same MIPC column and the column was eluted with a gradient mobile phase as in Example 1. A chromatogram (see FIG. 12) identical to that seen in FIG. 10 was produced except that the component peaks were twice the area compared to those in Example 1. There were no double peaks or broad peaks. This showed that the second aliquot remained intact at the top of the column and did not leech down. The fact that the component peaks of the third aliquot were sharp and twice the area of FIG. 10 demonstrated again, that the second aliquot accumulated at the top of the column and the chromatogram of the third aliquot was additive with the second aliquot. Without wishing to be bound by theory, when a gradient mobile phase is used in DNA separations on an MIPC column, fragments do not migrate down the column at all until the mobile phase reaches a sufficient concentration of organic solvent to elute a fragment of a particular size. At that point the fragments elute from the top of the column and quickly achieve the same linear velocity as the mobile phase. The distance of travel down a column needed for the a particular fragment to desorb and reach the linear velocity of the mobile phase is approximately 1 cm for a 15 minute size based separation and approximately 4 mm for mutation detection (partially denaturing-based) 8.3 minute separation. This has been determined by comparing separations on 1 cm vs. 5 cm columns and 2.0 mm vs. 5 cm columns, respectively.

Figure 13:
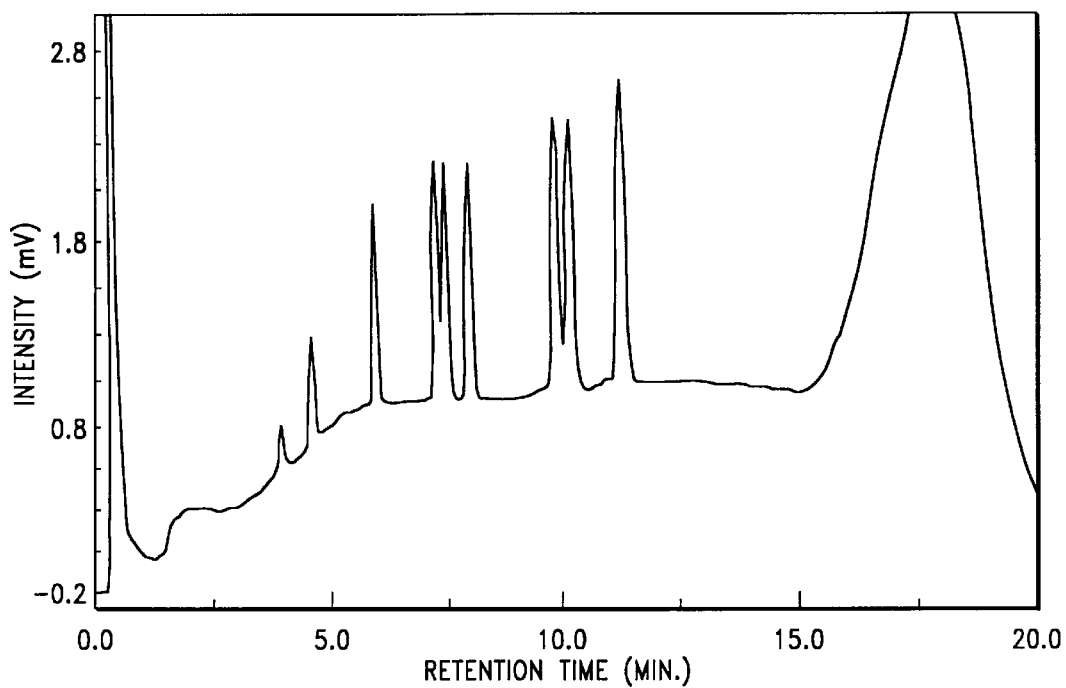
FIG. 13 is a size-based separation under nondenaturing conditions of pUC18DNA-HaeIII digest on a 1 cm column.
Figure 14:
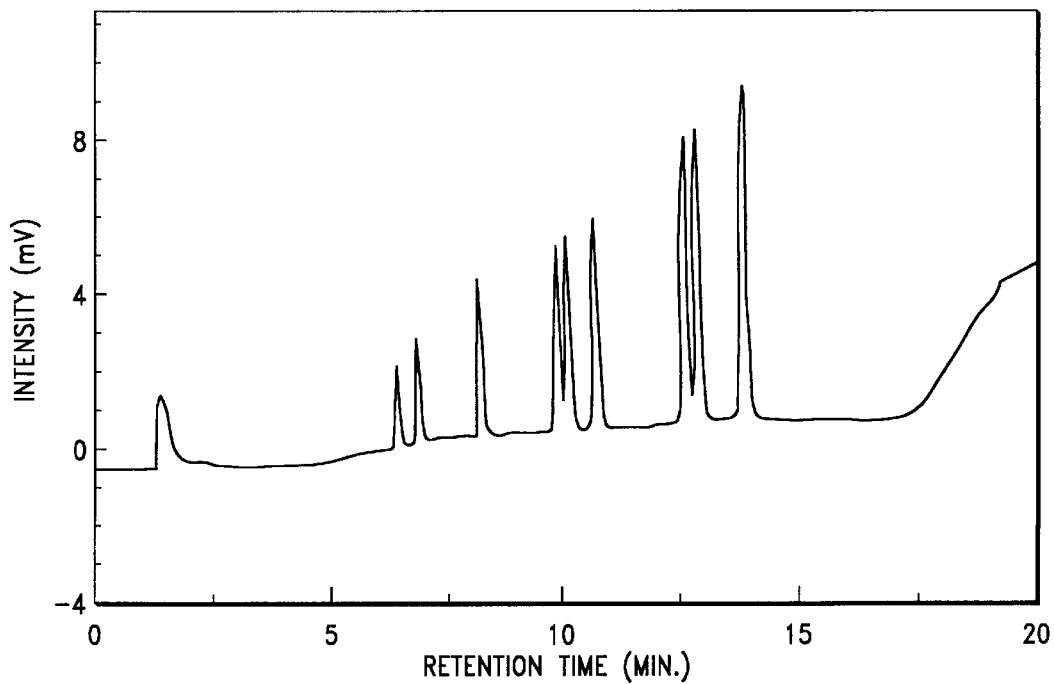
FIG. 14 is a size-based separation under nondenaturing conditions of pUC18DNA-HaeIII digest on a 5 cm column.

Not only are the separations largely completed in the first few mm of the column, but also the selectivity remains unchanged when the column length is changed. The separations are size-based not sequence-based. This is determined by examining the relative positions of the fragment peaks under size-based and denaturing conditions for different column lengths. The gradient process produces identical sized based separations of pUC18DNA-HaeIII digest. As expected, the retention times are shorter on the shorter column. The size separation on the 1 cm column (FIG. 13) is almost identical to the separation for the 5 cm column (FIG. 14). Separations of a hybridized 209 bp mutation standard (as described hereinbelow) under partially denaturing conditions are shown for different column lengths in FIG. 8 for the 1 cm column and in FIG. 4 for the 5 cm column. An important factor influencing separation performance is the column packing procedure. In a preferred procedure, the separation media at the top of the column is carefully smoothed before the column end fitting is placed on the end of the column.

However, subsequent experiments performed by Applicants in which an isocratic mobile phase was used to separate the same a pUC18 DNA-HaeIII restriction enzyme digest were consistent with a different elution behavior than that observed with a gradient elution. Separations of dsDNA were found to be dependent on column length, which is consistent with a partitioning mechanism.

Using isocratic elution conditions, the plate count at peaks eluting at approximately 9 minutes was 700 for the 1 cm column and 3000 for the 5 cm column. The plate count (and resolving power) was more than 4 times higher for the longer column when isocratic elution conditions were used. However, in order to acquire this data under isocratic conditions, special procedures not required in standard MIPC are required to identify the peak being detected.

Figure 15:
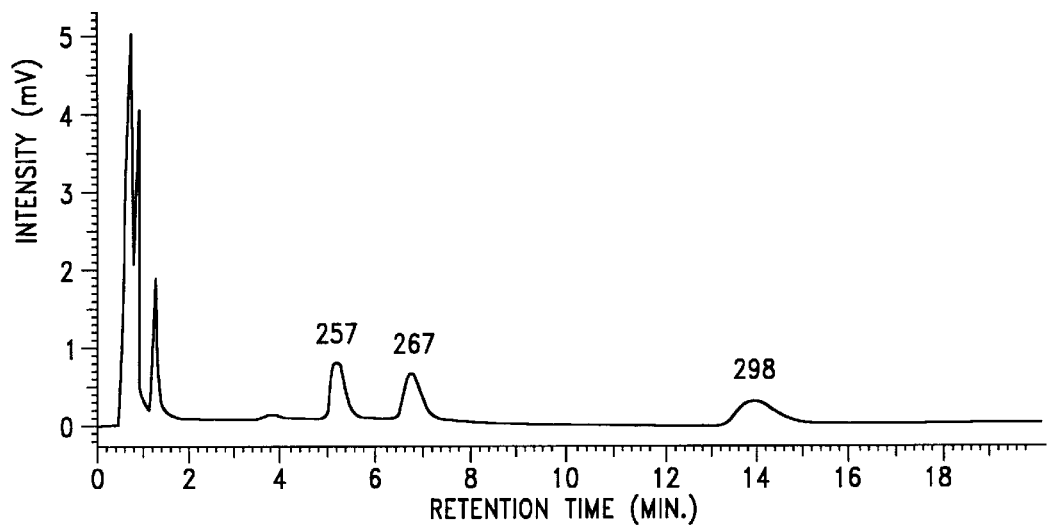
FIG. 15 is a MIPC chromatogram showing the separation of a pUC18 DNA-HaeIII restriction enzyme digest using an isocratic mobile phase containing 14% acetonitrile.
Figure 16:
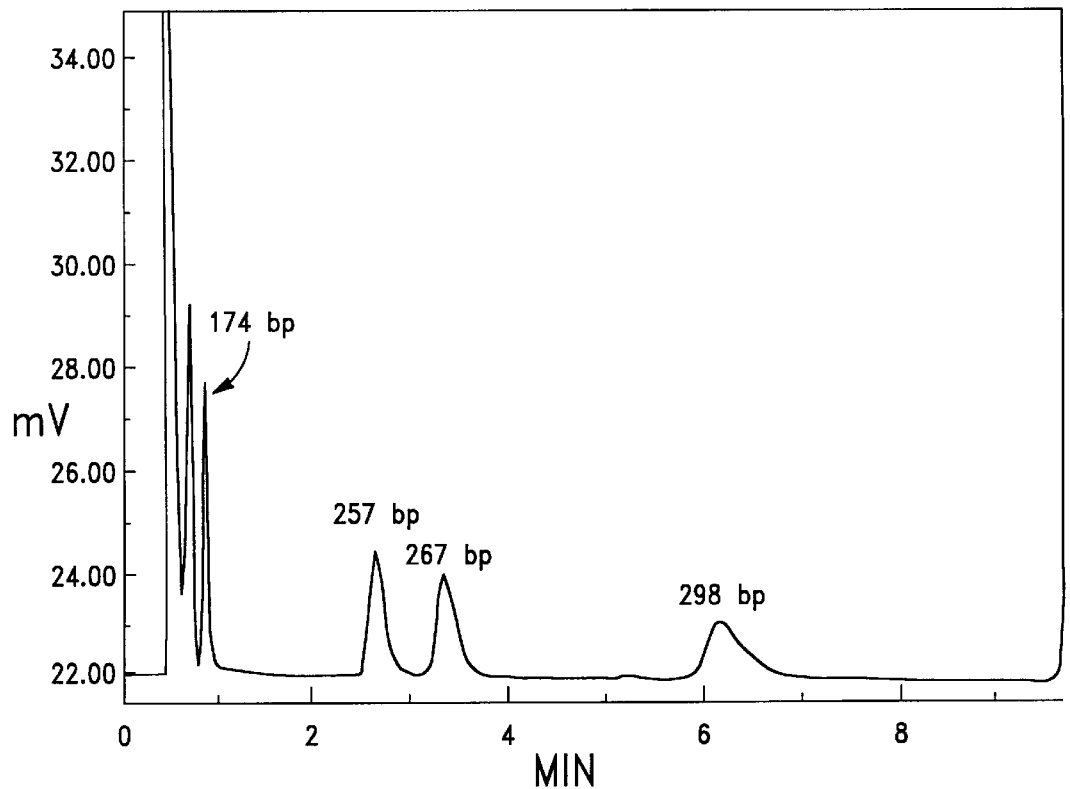
FIG. 16 is identical to FIG. 15 except that the isocratic mobile phase containing 14.25% acetonitrile.

Isocratic elution was surprisingly found by Applicants to provide far better separation of component fragments than could be achieved with a gradient elution. Therefore, in one embodiment, the present invention provides a method for enhancing the separation dsDNA fragments on an MIPC column by using an isocratic mobile phase to elute fragments from the column. However, Applicants observed that, although isocratic elution afforded superior separation of dsDNA than gradient elution, the chromatography was extremely sensitive to the concentration of the organic component in the mobile phase. Thus FIG. 15 shows a separation of a pUC18 HaeIII digest wherein the fragments were eluted with a mobile phase comprising 14% acetonitrile. The 257 bp and 267 bp fragments eluted at 5.17 min and 6.73 min, respectively. When the acetonitrile concentration was increase by a very small increment, to 14.25%, the 257 bp and 267 bp fragments eluted at about 2.7 min and about 3.4 min, respectively, as seen in FIG. 16 and described in Example 2. Thus, a 0.25% increase in the acetonitrile concentration reduced the retention time of the subject peaks by about 2.47 min and 3.23 min respectively.

Figure 17:
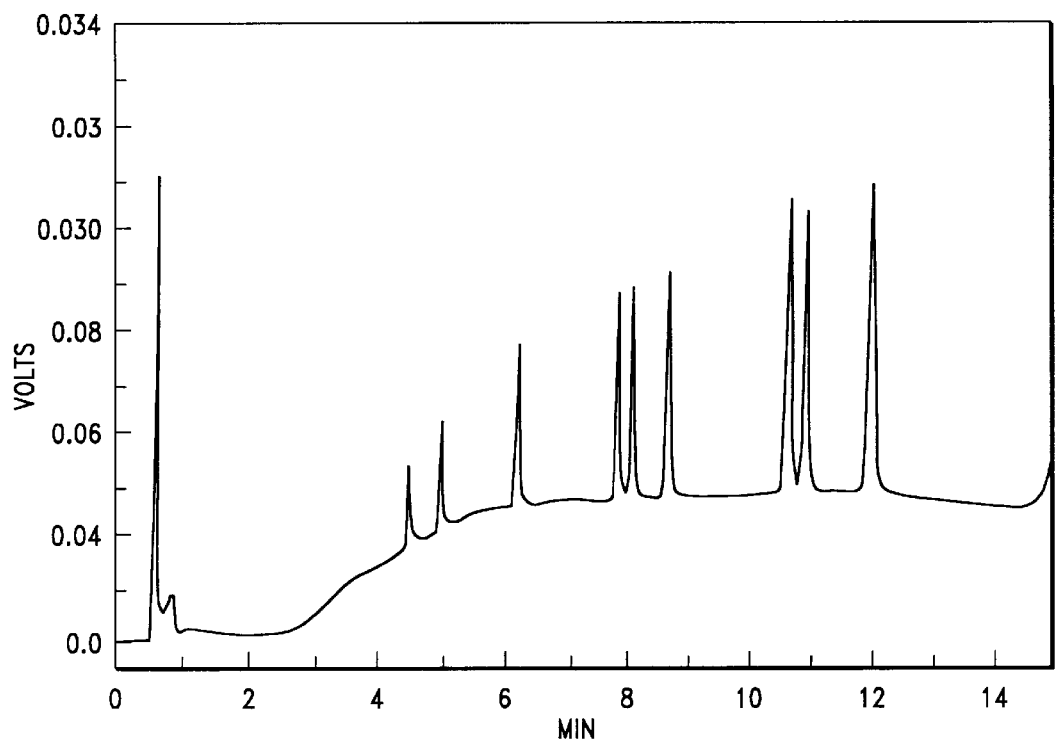
FIG. 17 is a MIPC chromatogram showing the separation of a pUC18 DNA-HaeIII restriction enzyme digest using a gradient mobile phase.

By way of contrast, the gradient elution of the same pUC18 HaeIII digest separated the above mentioned 257 bp and 267 bp fragments at 7.78 min and 8.02 min, respectively, as shown in FIG. 17. Of particular note is the fact that the two subject peaks were separated by only 0.24 min in the gradient elution mode compared to about 0.7 min to 1.5 min when an isocratic mobile phase was used.

The instrument used for this work can change the solvent concentration of integer units e.g. 41, 42, 43, etc., for example. The instrument included a low pressure gradient device, i.e, the gradient is formed by valves that are timed to be open a proportion of time within a one second cycle. For example a isocratic solvent concentration of 60% B eluant has valve A open 40% of the time and valve B open 60% of the time. The error in the % B concentration, including incomplete mixing of solvents A and B, was less than 1%.

Stepped isocratic runs could also be performed where, for example, 40% B could be used for a time period (e.g. 5 minutes) and then could be stepped up to an isocratic solvent concentration of 41% for an equal time period, etc.

Separations of dsDNA fragments by MIPC under isocratic elution conditions are extremely sensitive to solvent composition. Small changes in the composition of solvent mixtures contained in solvent reservoirs can occur as a result of evaporation. Such changes can result in differences in the retention times of fragments from identical samples. To prevent changes in retention time resulting from changing solvent composition it is important to keep solvent reservoir bottles tightly closed with caps, PARAFILM, aluminum foil, or similar materials. In addition, when helium sparging is used to de-gas solvents, the flow of gas should be reduced to a minimum in order to minimize the evaporation of solvent. The use of an in-line degasser is a preferred method used to minimize solvent evaporation and maintain constant solvent composition. An example of a suitable degasser is DEGASET, Model 6324 (MetaChem Technologies, Torrance, Calif.).

In another embodiment of the invention, Applicants have found that retention time inconsistencies resulting from solvent concentration changes due to evaporation, can be eliminated by using pure solvents in the HPLC solvent reservoirs rather than solvent mixtures. In this embodiment, a ternary pump system is used to mix water, organic solvent and an aqueous solution of counterion agent to provide the desired composition of mobile phase. The only solution involved is that of the aqueous counterion agent. However, the evaporation of water from a closed HPLC reservoir is insignificant, so the concentration of counterion agent remains constant. However, evaporation of acetonitrile form a 25% aqueous solution, which is significant in the present isocratic separation of dsDNA mixtures by MIPC, is avoided. The computerized pumps are programmed to provide, for example, a 25% acetonitrile solution, which is 0.1M in TEAA, by combining appropriate amounts of pure water, pure acetonitrile and aqueous TEAA.

The experimentally demonstrated observation, that there are two different mechanisms controlling the separation of dsDNA fragments on an MIPC column, wherein the mechanisms depend on the use of a gradient elution or an isocratic elution has not been previously reported. More importantly, the use of isocratic mobile phases to effect chromatographic separations is well established in the art. However, isocratic separations of dsDNA have been unsuccessful prior to the work reported by Applicants herein. In fact, it had been assumed that dsDNA could only be separated chromatographically using a gradient mobile phase because when an isocratic mobile phase was used, the dsDNA did not separate. The work described herein is the first reported chromatographic separation of dsDNA wherein the chromatography comprises isocratic elution.

There are several types of counterions suitable for use with MIPC. These include a mono-, di-, or trialkylamine that can be protonated to form a positive counter charge or a quaternary alkyl substituted amine that already contains a positive counter charge. The alkyl substitutions may be uniform (for example, triethylammonium acetate or tetrapropylammonium acetate) or mixed (for example, propyidiethylammonium acetate). The size of the alkyl group may be small (methyl) or large (up to 30 carbons) especially if only one of the substituted alkyl groups is large and the others are small. For example octyidimethylammonium acetate is a suitable counterion agent. Preferred counterion agents are those containing alkyl groups from the ethyl, propyl or butyl size range.

The mobile phase preferably contains a counterion agent. Typical counterion agents include trialkylammonium salts of organic or inorganic acids, such as lower alkyl primary, secondary, and lower tertiary amines, lower trialkyammonium salts and lower quaternary alkyalmmonium salts. Examples of counterion agents include octylammonium acetate, octadimethylammonium acetate, decylammonium acetate, octadecylammonium acetate, pyridiniumammonium acetate, cyclohexylammonium acetate, diethylammonium acetate, propylethylammonium acetate, propyldiethylammonium acetate, butylethylammonium acetate, methylhexylammonium acetate, tetramethylammonium acetate, tetraethylammonium acetate, tetrapropylammonium acetate, tetrabutylammonium acetate, dimethydiethylammonium acetate, triethylammonium acetate, tripropylammonium acetate, tributylammonium acetate. Although the anion in the above examples is acetate, other anions may also be used, including carbonate, phosphate, sulfate, nitrate, propionate, formate, chloride, and bromide, or any combination of cation and anion. These and other agents are described by Gjerde, et al. in *Ion Chromatography, 2nd Ed.*, Dr. Alfred Hüthig Verlag Heidelberg (1987). Counterion agents that are volatile are preferred for use in the method of the invention, with triethylammonium acetate (TEAA) and triethylammonium hexafluoroisopropyl alcohol being most preferred.

To achieve optimum peak resolution during the separation of DNA by MIPC, the method is preferably performed at a temperature within the range of 20° C. to 90° C.; more preferably, 30° C. to 80° C.; most preferably, 50° C. to 75° C. The flow rate is selected to yield a back pressure not exceeding 5000 psi. In general, separation of single-stranded fragments should be performed at higher temperatures.

Applicants have found that the temperature at which the separation is performed affects the choice of organic solvents used in the separation. One reason is that the solvents affect the temperature at which a double stranded DNA will melt to form two single strands or a partially melted complex of single and double stranded DNA. Some solvents can stabilize the melted structure better than other solvents. The other reason a solvent is important is because it affects the distribution of the DNA between the mobile phase and the stationary phase. Acetonitrile and 1-propanol are preferred solvents in these cases. Finally, the toxicity (and cost) of the solvent can be important. In this case, methanol is preferred over acetonitrile and 1-propanol is preferred over methanol.

When the separation is performed at a temperature within the above range, an organic solvent that is water soluble is preferably used, for example, alcohols, nitriles, dimethylformamide (DMF), tetrahydrofuran (THF), esters, and ethers. Water soluble solvents are defined as those which exist as a single phase with aqueous systems under all conditions of operation of the present invention. Solvents which are particularly preferred for use in the method of this invention include methanol, ethanol, 2-propanol, 1-propanol, tetrahydrofuran (THF), and acetonitrile, with acetonitrile being most preferred overall.

Size based separations using an isocratic mobile phase are best performed below a temperature which will denature a dsDNA. This temperature range comprises 25° C. to about 55° C., with about 50° C. being most preferred.

Applicants have shown that use of a specific concentration of organic component in the isocratic mobile phase results in enhanced separation dsDNA within a relatively narrow range of base pair lengths, referred to herein as a "target range" of base pair lengths. Therefore, in another embodiment, a mixture of dsDNA can be separated using a gradient mobile phase to separate fragments within a selected base pair range. Chromatographic fractions containing fragments within the target range can be isolated and re-chromatographed using an isocratic mobile phase. The enhanced separation afforded by the use of an isocratic mobile phase makes possible the isolation of one or more pure fragments within the target range. Such pure fragments can then be amplified using PCR to provide relatively large quantities of high purity product. High purity dsDNA fragments have many uses, e.g., sequencing, forensic investigations, cloning and sample preparation prior to DNA analysis.

Figure 18:
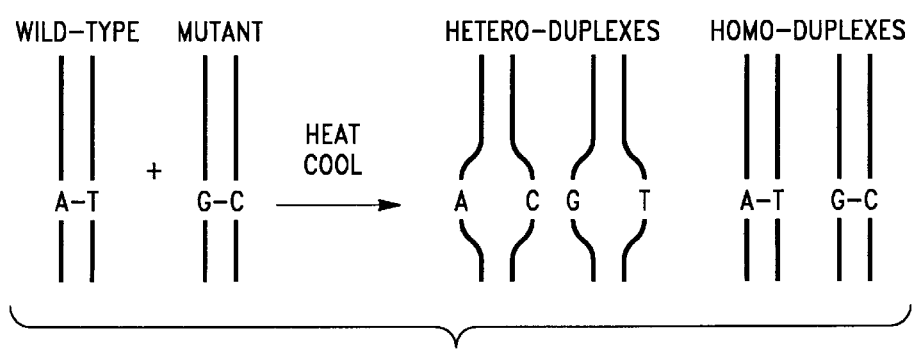
FIG. 18 is a schematic representation of a hybridization of a wild type dsDNA fragment with a mutant dsDNA fragment.

In another embodiment, the present invention can be used to detect the presence or absence of mutations. In this embodiment, a sample dsDNA is hybridized with wild type. Hybridization, a standard process in the biotechnology art, is effected by heating a solution of sample and wild type DNA to about 90° C. for about 5 minutes, then slowly cooling the solution to ambient temperature over 45 to 60 minutes. During the heating period, the dsDNA strands denature. Upon slow cooling, they recombine in a statistical fashion. Therefore, if the sample contains a mutation, the hybridized product will contain a mixture of two homoduplexes and two heteroduplexes. A schematic of the hybridization process is shown in FIG. 18.

Heteroduplexes and homoduplexes have been separated by HPLC using gradient elution and "partially denaturing conditions" (U.S. Pat. No. 5,795,976 to Oefner (1998)). However the separations achieved by Oefner were poorly resolved and not always reproducible.

The term "partially denaturing conditions" is known in the art. It refers to the well known fact that a heteroduplex will denature at a site of base pair mismatch at a lower temperature than the remainder of the strand which comprises fully complimentary bases.

Applicants have applied gradient elution MIPC under partially denaturing conditions to achieve good separations of homo and heteroduplexes, as described in U.S. patent application Ser. No. 09/129,105, filed Aug. 4, 1998. This reference and the references contained therein are incorporated in their entireties herein. MIPC separates dsDNA fragments by base pair length under non-denaturing conditions. However, under partially denaturing conditions, a structural component effects the separation as well. Therefore, homoduplexes and heteroduplexes separate from each other when MIPC is conducted at partially denaturing temperature. The partially denaturing temperature varies with the sequence of any given DNA fragment. However, Applicants have found that a preferred partially denaturing temperature is achieved between 50° C. to 70° C. a most preferred partially denaturing temperature is 53° C. to 62° C., and an optimum partially denaturing temperature is about 56° C. Liquid chromatographic separation of homoduplexes and heteroduplexes using an isocratic mobile phase has not been previously reported.

Figure 19:
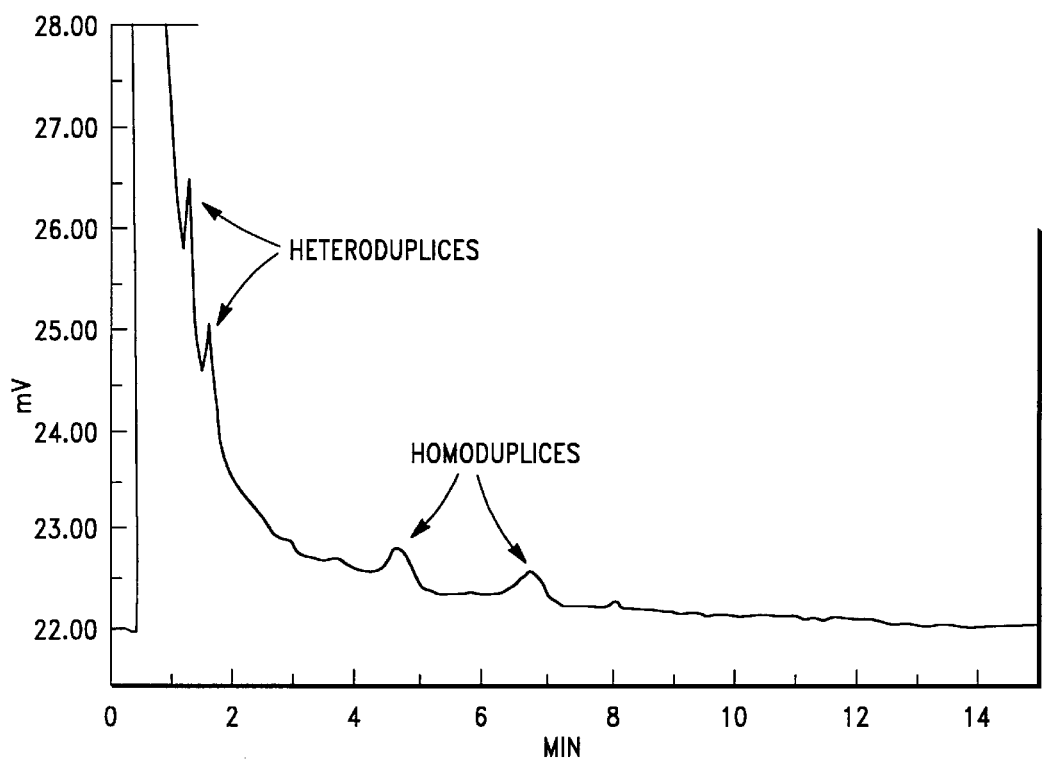
FIG. 19 is a MIPC chromatogram showing the separation of homoduplexes and heteroduplexes using an isocratic mobile phase.

In this embodiment of the present invention, the hybridized dsDNA mixture is applied to a MIPC column comprising non-polar separation media and the fragments are eluted with an isocratic mobile phase. The difference in retention time, shown in FIG. 19, of the heteroduplexes and homoduplexes is more than two minutes, a completely unambiguous separation and a great improvement over a similar separation using gradient elution. This wide separation can be used to advantage to collect and isolate a heteroduplex as it elutes from the column. PCR amplification of the heteroduplex will provide sufficient pure material for sequence determination or other applications which require high purity material.

In a preferred embodiment of the present invention, "kinetic separations" are used for mutation detection and utilize MIPC separation at a temperature which yields partial melting of mismatches. This embodiment achieves better resolution between heteroduplexes and homoduplexes. When mixtures of DNA fragments are applied to an MIPC column, they are separated by size, the smaller fragments eluting from the column first. However, when MIPC is performed at an elevated temperature which is sufficient to denature that portion of a DNA fragment which contains a non-complimentary base pair or polymorphism, then heteroduplexes separate from homoduplexes.

The "kinetic separation" is a method of separation performed under isocratic or near-isocratic conditions where the temperature conditions are selected so that the hysteresis effect (illustrated in FIG. 20) is used to enhance the separation of heteroduplexes and homoduplex species. The temperature is selected so that the partially melted heteroduplex species does not interact with the stationary phase but travels through the column almost at the linear velocity of the mobile phase. The homoduplex interacts or is adsorbed by the column and elutes later.

During the cooling step of hybridization, the higher melting homoduplexes rapidly renature completely while the heteroduplexes, having been more extensively denatured during heating, renature slowly. Cooling while melting temperatures are fixed is equivalent to maintaining a constant temperature and raising the melting temperature.

Figure 20:
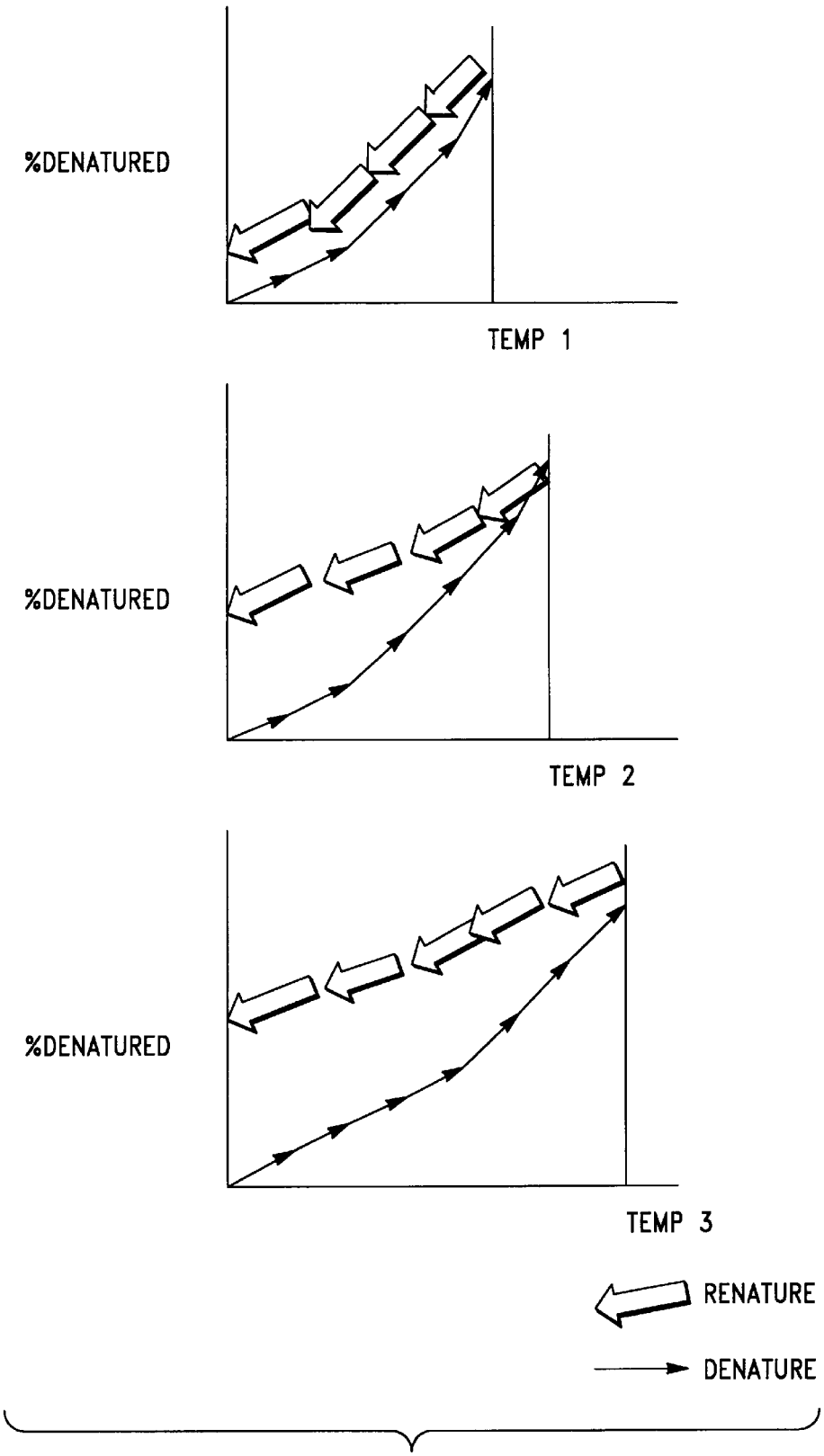
FIG. 20 illustrates the effect of higher temperatures on percentage of dsDNA denaturation.

Renaturation is kinetically slow beyond a critical degree of denaturation. That is, the higher the temperature used for denaturation, the longer the time required for renaturation to occur. FIG. 20 illustrates the effect of higher temperatures on percentage of denaturation.

All references cited herein are hereby incorporated by reference in their entirety.

Other features of the invention will become apparent in the course of the following descriptions of exemplary embodiments which are given for illustration of the invention and are not intended to be limiting thereof.

Procedures described in the past tense in the examples below have been carried out in the laboratory. Procedures described in the present tense have not yet been carried out in the laboratory, and are constructively reduced to practice with the filing of this application.

EXAMPLE 1

A pUC18DNA-HaeIII restriction enzyme digest was chromatographed on an MIPC column. The separation of the dsDNA fragments therein, using gradient elution is shown in FIG. 10. The gradient used is shown below. Solvent A was 0.1M triethylammoniun acetate (TEAA). Solvent B was 25% acetonitrile in 0.1M TEAA. The chromatography was performed at 51° C. using a flow rate of 0.75 mL/min, and monitored at 260 nm.

| Time (min) | % A | % B |
|---|---|---|
| 0 | 65 | 35 |
| 3.0 | 45 | 55 |
| 7 | 35 | 65 |
| 9.5 | 35 | 65 |
| 9.5 | 0 | 100 |
| 11.0 | 0 | 100 |
| 11.0 | 35 | 65 |

EXAMPLE 2

A pUC18 DNA-HaeIII restriction enzyme digest was chromatographed as described in EXAMPLE 1 except that the column was eluted with an isocratic mobile phase comprising 14.25% acetonitrile in 0.1M TEAA. This mobile phase was chosen to focus the separation on the base pair fragments in the 200–299 bp target range. FIG. 16 shows the improved separation of fragments in this base pair range compared to the gradient elution chromatogram of FIG. 17.

EXAMPLE 3

Figure 21:
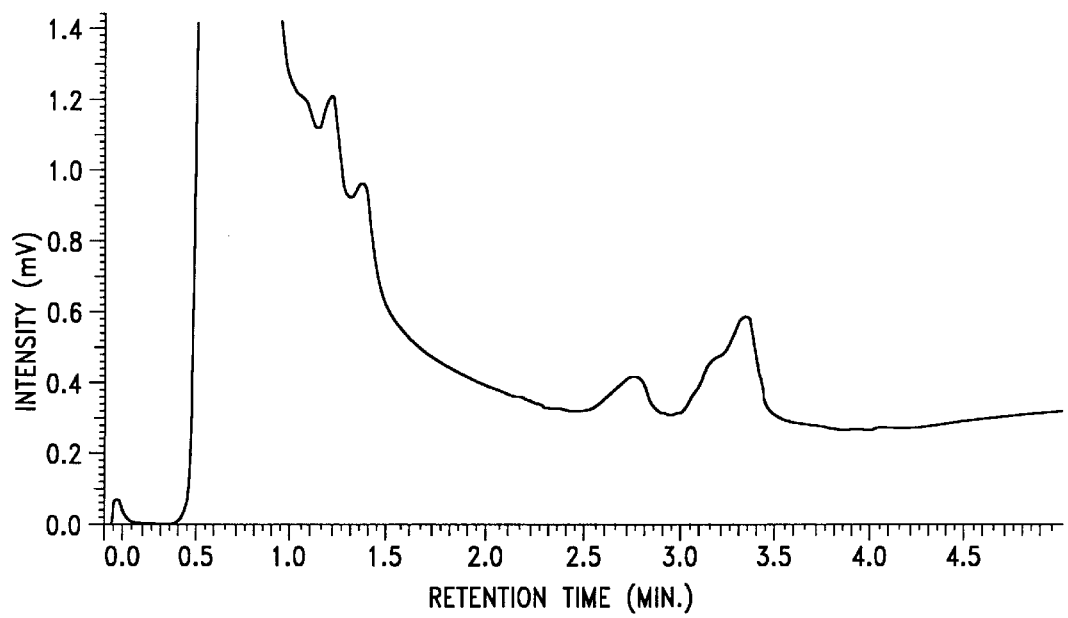
FIG. 21 illustrates a kinetic separation performed with a hybridized 209 base pair fragment from human Y chromosome, locus DYS271 with an A to G mutation at position 168.

FIG. 21 illustrates a kinetic separation performed with a hybridized 209 base pair fragment from human Y chromosome, locus DYS271 with an A to G mutation at position 168 (a mixture of wild type and mutant strands are available as a mutation standard from Transgenomic, Inc.). The heteroduplexes eluted at retention times of 1.25 and 1.40 minutes, while the homoduplexes eluted at 2.75 and 3.35 minutes. For FIG. 21, the separation gradient used is shown below. Solvent A was 0.1M triethylammoniun acetate (TEAA). Solvent B was 25% acetonitrile in 0.1M TEAA. The chromatography was performed at 56° C. using a flow rate of 0.90 mL/min, and monitored at 260 nm.

| Time (min) | A (%) | B (%) |
|---|---|---|
| 0.0 | 46 | 54 |
| 0.5 | 45 | 55 |
| 4.0 | 38 | 62 |
| 4.1 | 0 | 100 |
| 4.5 | 0 | 100 |
| 4.6 | 46 | 54 |
| 5.0 | 46 | 54 |

EXAMPLE 4

A pUC18 Hae III restriction enzyme digest and a 209 mutation standard were chromatographed on MIPC columns of various dimensions. Columns 50×7.8 mm, 50×4.6 mm, 20×7.8 mm, and 10×4.6 mm were used to elute fragments of both standards and a 4×4.6 mm column was used with the 209 mutation standard.

The tables below summarize the resolution of the peaks and a range of retention times. Gradients used are also shown below. Solvent A is 0.1 M TEAA and Solvent B is 25% ACN in 0.1 M TEAA.

Figure 1:
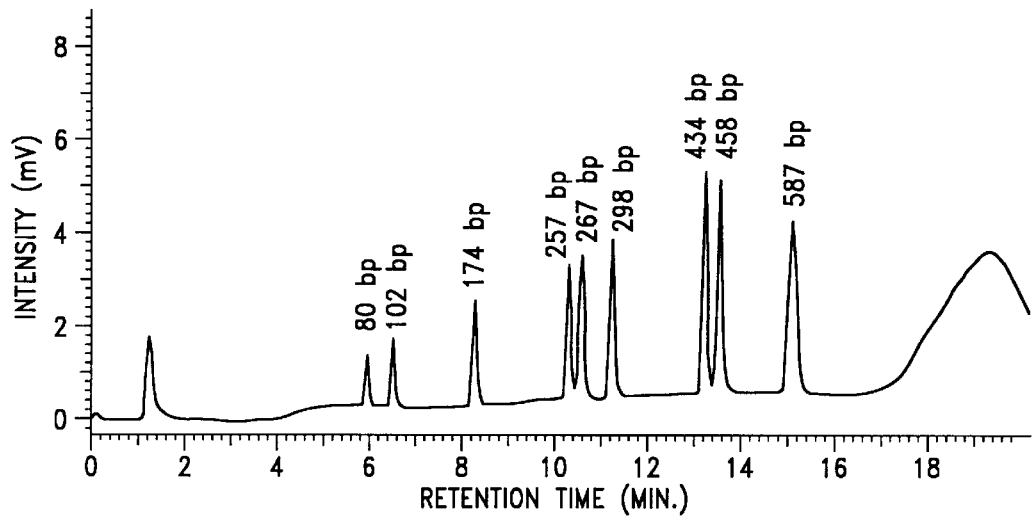
FIG. 1 is a MIPC chromatogram showing the separation of a pUC18 DNA-HaeIII restriction enzyme digest using a gradient mobile phase.
Figure 5:
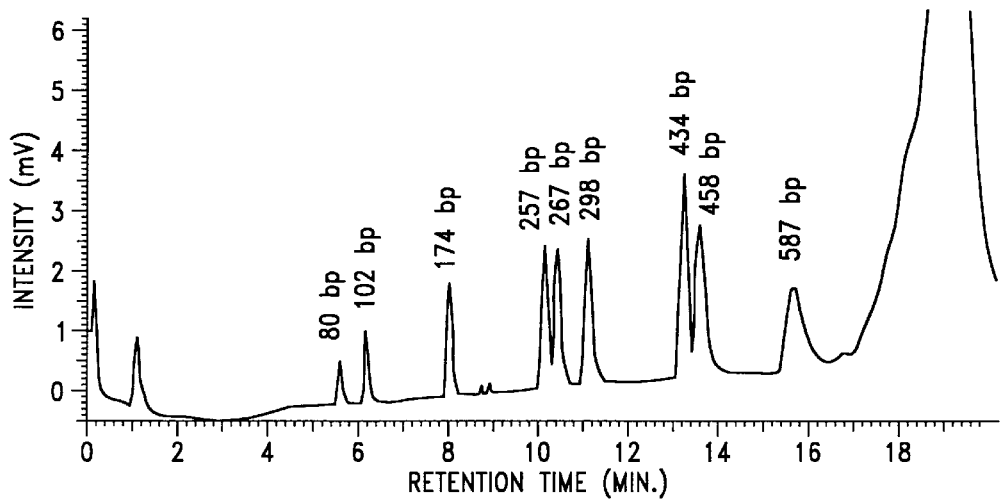
FIG. 5 is a MIPC chromatogram showing the separation of a pUC18 DNA-HaeIII restriction enzyme digest using a gradient mobile phase.

| pUC 18 HaeIII | | | |
|---|---|---|---|
| Column Dimensions | 257/267 Peak Resolution | 434/458 Peak Resolution | 587 bp Retention Time (min) |
| 50 × 7.8 mm FIG. 1 | 1.78 | 1.99 | 14.91 |
| 50 × 4.6 mm FIG. 3 | 1.81 | 1.72 | 13.03 |
| 20 × 7.8 mm FIG. 5 | 1.24 | 1.28 | 15.47 |
| 10 × 4.6 mm FIG. 7 | 1.27 | 1.33 | 11.26 |
| 4 × 4.6 mm | — | — | — |

Figure 2:
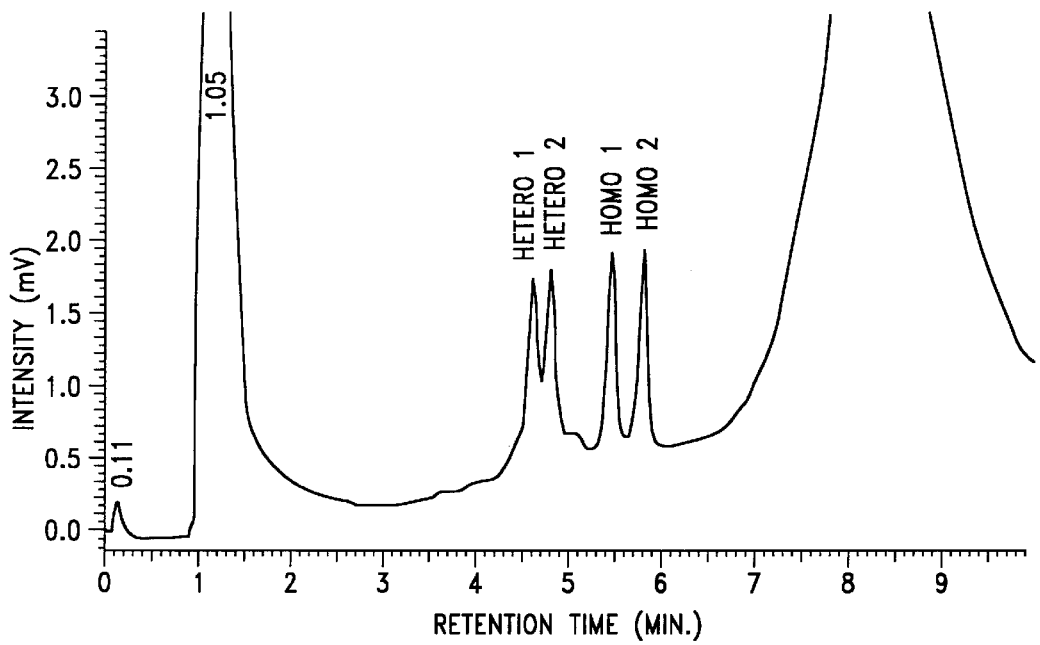
FIG. 2 is a separation under partially denaturing conditions of a hybridized 209 bp mutation standard.
Figure 4:
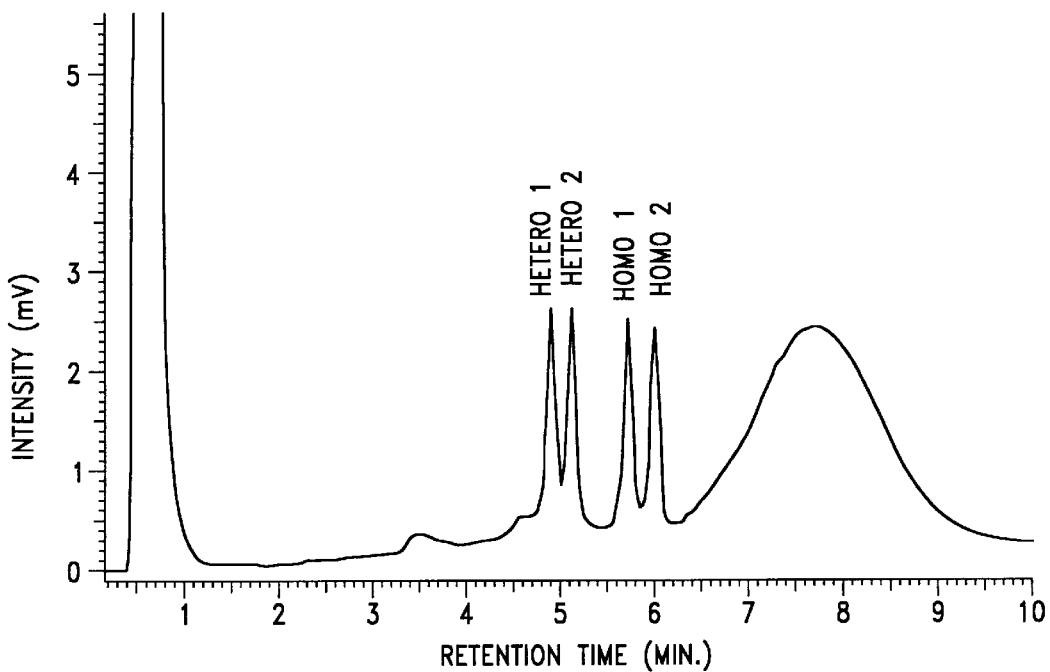
FIG. 4 is a separation under partially denaturing conditions of a hybridized 209 bp mutation standard.
Figure 6:
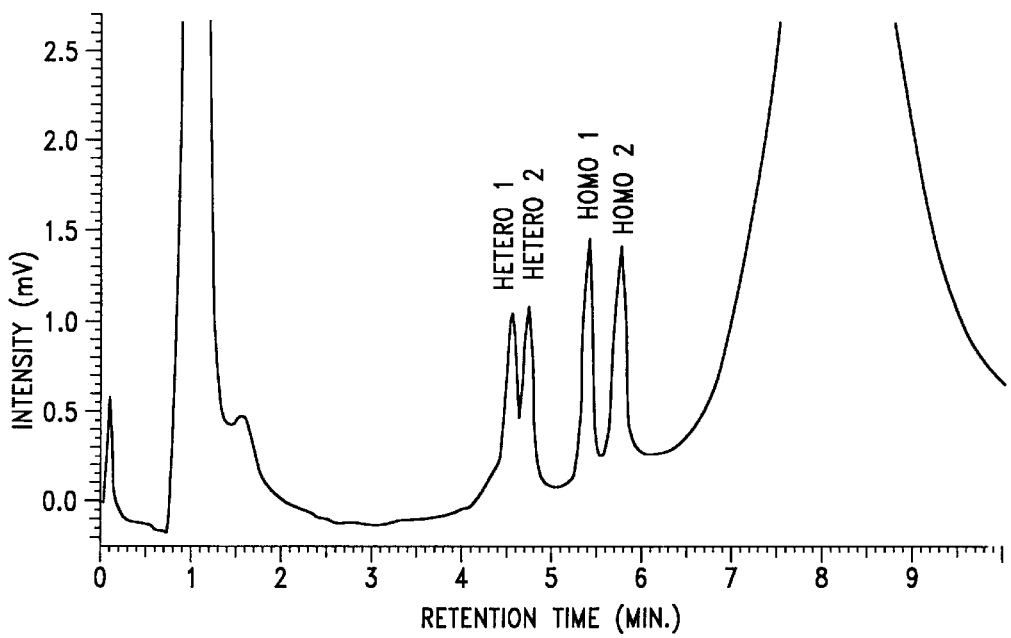
FIG. 6 is a separation under partially denaturing conditions of a hybridized 209 bp mutation standard.
Figure 8:
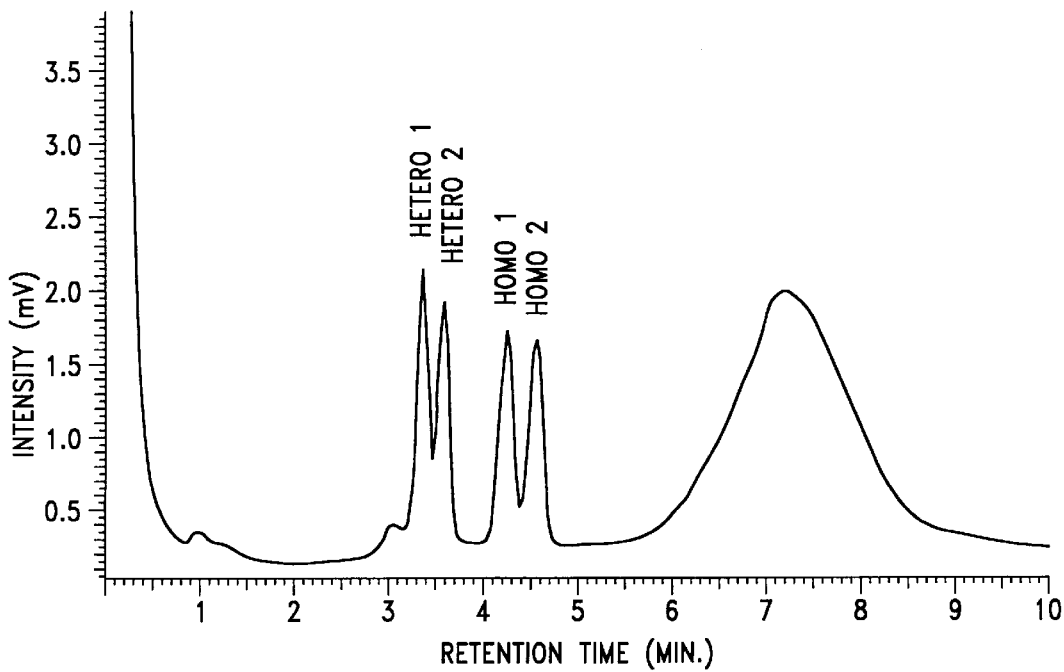
FIG. 8 is a separation under partially denaturing conditions of a hybridized 209 bp mutation standard.
Figure 9:
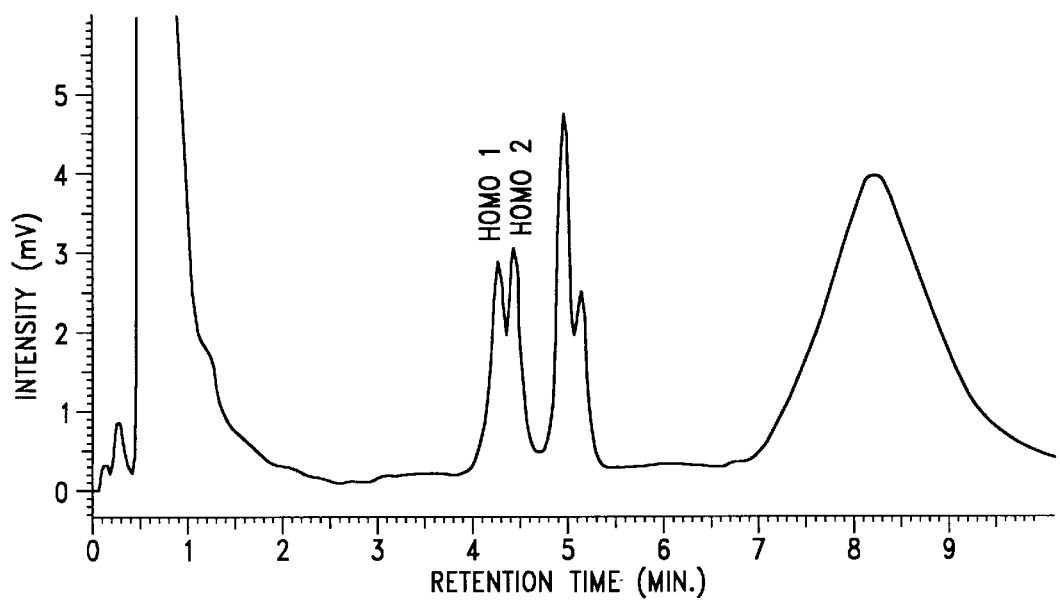
FIG. 9 is a separation under partially denaturing conditions of a hybridized 209 bp mutation standard.

| M209 Standard | | | | |
|---|---|---|---|---|
| Column Dimensions | Hetero Peak Resolution | Homo Peak Resolution | Het/Homo Peak Resolution | Retention Time (min) |
| 50 × 7.8 mm FIG. 2 | 1.10 | 2.36 | 4.31 | 4.56–5.72 |
| 50 × 4.6 mm FIG. 4 | 1.51 | 1.94 | 4.11 | 4.76–5.84 |
| 20 × 7.8 mm FIG. 6 | 0.92 | 1.99 | 3.77 | 4.48–5.65 |
| 10 × 4.6 mm FIG. 8 | 1.02 | 1.22 | 2.79 | 3.43–4.57 |
| 4 × 4.6 mm FIG. 9 | 0.77 | 0.80 | 2.20 | 4.21–5.05 |

For FIGS. 1, 3, 5 and 7, the separation gradient used is shown below. The chromatography was performed at 50° C. using a flow rate of 0.750 mL/min, and monitored at 260 nm.

| Time (min) | A (%) | B (%) |
|---|---|---|
| 0.0 | 65 | 35 |
| 3.0 | 45 | 55 |
| 10.0 | 35 | 65 |
| 13.5 | 35 | 65 |
| 15.0 | 0 | 100 |
| 16.5 | 0 | 100 |
| 17.5 | 65 | 35 |
| 19.5 | 65 | 35 |

For FIGS. 2, 4, 6, 8 and 9, the separation gradient used is shown below. The chromatography was performed at 56° C. using a flow rate of 0.900 mL/min, and monitored at 260 nm.

| Time (min) | A (%) | B (%) |
|---|---|---|
| 0.0 | 50 | 50 |
| 0.5 | 47 | 53 |
| 4.0 | 40 | 60 |
| 5.5 | 0 | 100 |
| 6.5 | 50 | 50 |
| 8.5 | 50 | 50 |

EXAMPLE 5

Figure 22:
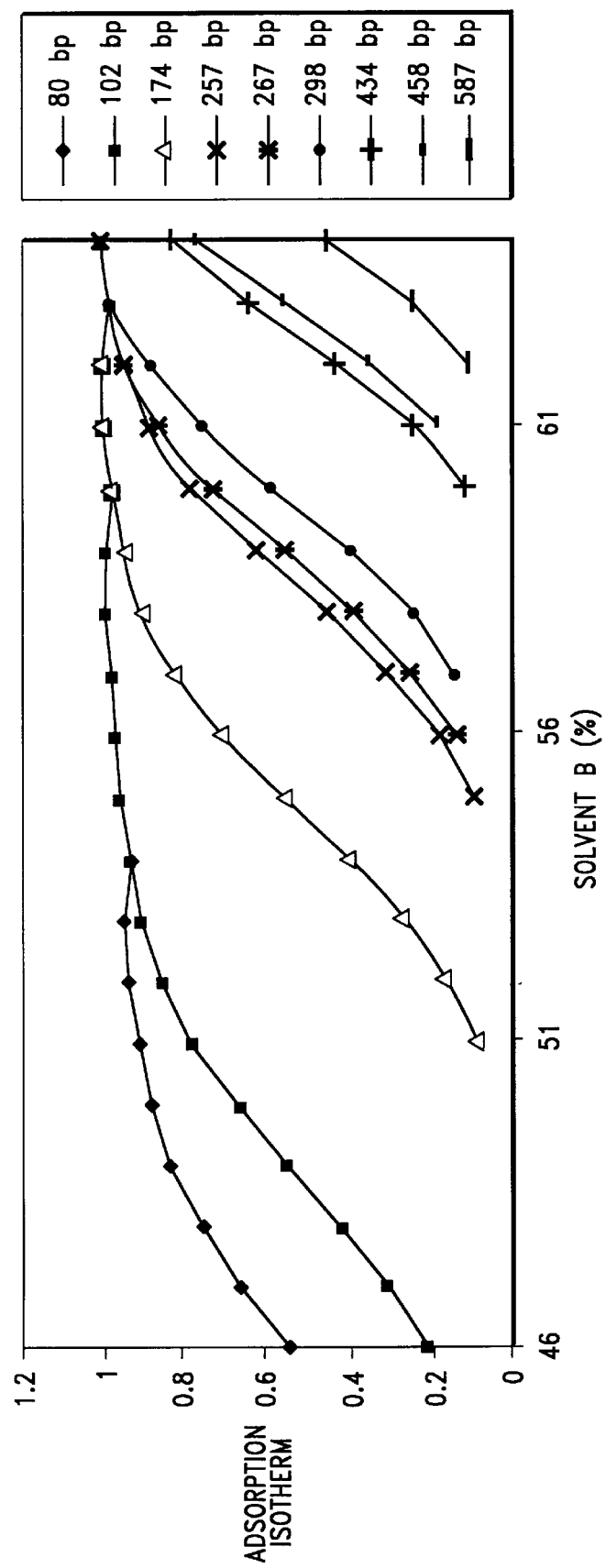
FIG. 22 represents the adsorption isotherms plotted against the concentration of solvent B for pUC18 DNA-HaeIII restriction enzyme digest.

Systematic studies were performed to measure the isotherms of the separation process in order to determine the thermodynamic properties of the system. The separations were performed stepwise under isocratic conditions. Also, a gradient was used to remove any remaining fragments from the column so the peaks could be counted and the peaks separated under isocratic conditions could be identified. The studies showed that under isocratic conditions, the separations are size dependent and not sequence dependent. For example, it has been shown that high resolution of double stranded DNA can be achieved for fragment lengths of 100–500 base pairs separated on the basis of size. This is confirmed because of the wide range of G-C composition present in the various fragments of the samples used. Isocratic conditions were carried out from 46% to 62% B with 1% increments of the concentration of B. FIG. 23 lists the retention time in minutes of pUC18 DNA-HaeIII restriction enzyme digest fragments of lengths 80–587 base pairs. FIG. 22 represents the adsorption isotherms plotted against the concentration of solvent B for pUC18 DNA-HaeIII restriction enzyme digest.

For FIG. 22, the gradient used is shown below. Solvent A was 0.1M triethylammoniun acetate (TEAA). Solvent B was 25% acetonitrile in 0.1M TEAA. The chromatography was monitored at 260 nm. The chromatographic separation was performed at 50° C. using a mobile phase flow rate of 0.750 mL/min. The equilibrium time was 5 min, and the acquisition time was 41.2 min. During the isocratic elution, 46% B was used.

| Time (min) | A (%) | B (%) |
|---|---|---|
| 0.0 | 54 | 46 |
| 20.0 | 54 | 46 |
| 35.0 | 39 | 65 |

-continued

| Time (min) | A (%) | B (%) |
|---|---|---|
| 35.1 | 0 | 100 |
| 36.1 | 0 | 100 |
| 36.2 | 54 | 46 |
| 41.2 | 54 | 46 |

While the foregoing has presented specific embodiments of the present invention, it is to be understood that these embodiments have been presented by way of example only. It is expected that others will perceive and practice variations which, though differing from the foregoing, do not depart from the spirit and scope of the invention as described and claimed herein.

What is claimed is:

1. A chromatographic method for separating a mixture of heteroduplex and homoduplex DNA molecules under conditions which selectively denature a mutation site present in the heteroduplex DNA molecule, comprising the steps of:
    (a) applying the mixture to a separation column containing a separation medium having a non-polar separation surface, and
    (b) separating said mixture by eluting said column using a mobile phase having a composition which remains essentially constant for the duration of the chromatographic separation.

2. A method of claim 1 wherein said target range is 1–5,000 base pairs.

3. A method of claim 1 wherein said range is 1–2,000 base pairs.

4. A method of claim 1 wherein said range is 1–99 base pairs.

5. A method of claim 1 wherein said range is 100–199 base pairs.

6. A method of claim 1 wherein said range is 200–299 base pairs.

7. A method of claim 1 wherein said range is 300–399 base pairs.

8. A method of claim 1 wherein said range is 400–499 base pairs.

9. A method of claim 1 wherein said surface is nonporous.

10. A method of claim 1 wherein said surface is porous.

11. A method of claim 1 wherein said medium comprises polymeric beads having a diameter of 0.5 to 100 microns.

12. A method of claim 1 wherein said medium comprises beads having an average diameter of 0.5 to 100 microns, the beads comprising particles coated with a hydrocarbon or non-polar hydrocarbon substituted polymer, or particles having substantially all polar groups which are derivatized with a non-polar hydrocarbon or substituted hydrocarbon group.

13. A method of claim 12 wherein said particles are a member selected from the group consisting of silica, silica carbide, silica nitrite, titanium oxide, aluminum oxide, zirconium oxide, carbon, insoluble polysaccharide, and diatomaceous earth.

14. A method of claim 1 wherein said surface has been subjected to an acid wash treatment in order to substantially remove multivalent cation contaminants from the non-polar separation surface.

15. A method of claim 1 wherein said mobile phase comprises an organic solvent and a counterion agent.

16. A method of claim 15, wherein said organic solvent is selected from the group consisting of alcohol, nitrile, dimethylformamide, tetrahydrofuran, ester, ether, and mixtures of one or more thereof.

17. A method of claim 15 wherein said counterion agent is selected from the group consisting of lower alkyl primary amine, lower alkyl secondary amine, lower alkyl tertiary amine, lower alkyl trialkyammonium salt, quaternary ammonium salt, and mixtures of one or more thereof.

18. A method of claim 15 wherein said counterion agent is selected from the group consisting of octylammonium acetate, octadimethylammonium acetate, decylammonium acetate, octadecylammonium acetate, pyridiniumammonium acetate, cyclohexylammonium acetate, diethylammonium acetate, propylethylammonium acetate, propyldiethylammonium acetate, butylethylammonium acetate, methylhexylammonium acetate, tetramethylammonium acetate, tetraethylammonium acetate, tetrapropylammonium acetate, tetrabutylammonium acetate, dimethydiethylammonium acetate, triethylammonium acetate, tripropylammonium acetate, tributylammonium acetate, tetraethylammonium acetate, tetrapropylammonium acetate, tetrabutylammonium acetate, triethylammonium hexafluoroisopropyl alcohol, and mixtures of one or more thereof.

19. A method of claim 15 wherein said counterion agent includes an anion, said anion is selected from the group comprising acetate, carbonate, phosphate, sulfate, nitrate, propionate, formate, chloride, and bromide.

20. A method of claim 1 wherein said mixture comprises at least a portion of a preliminary mixture of polynucleotides, said preliminary mixture of polynucleotides having been separated during a preliminary elution by flowing said preliminary mixture through a column containing a separation medium having a non-polar separation surface and separating said preliminary mixture using preliminary elution conditions which vary during said preliminary elution.

21. A method of claim 20 wherein said preliminary elution conditions include a preliminary mobile phase which varies in composition during said preliminary elution.

22. A method of claim 21 wherein said preliminary mobile phase comprises an organic solvent and a counterion agent.

23. A method of claim 22 which includes an increasing gradient of concentration of said organic solvent during said preliminary elution.

24. A method of claim 21 wherein said preliminary mobile phase comprises a chelating compound.

25. A method of claim 1 wherein said mixture comprises the product of a PCR amplification.

* * * * *